US012774178B2

(12) United States Patent
Ushiyama et al.

(10) Patent No.: US 12,774,178 B2
(45) Date of Patent: Oct. 27, 2026

(54) CARGO HANDLING APPARATUS, CONTROL DEVICE, CARGO HANDLING METHOD, AND STORAGE MEDIUM

(71) Applicant: Kabushiki Kaisha Toshiba, Kawasaki (JP)

(72) Inventors: Takafumi Ushiyama, Sagamihara (JP); Atsushi Sugahara, Kawasaki (JP); Naoyuki Hara, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 904 days.

(21) Appl. No.: 18/053,394

(22) Filed: Nov. 8, 2022

(65) Prior Publication Data

US 2023/0142013 A1 May 11, 2023

(30) Foreign Application Priority Data

Nov. 10, 2021 (JP) ................................ 2021-183548

(51) Int. Cl.
*B65G 61/00* (2006.01)
*B25J 9/02* (2006.01)
(Continued)

(52) U.S. Cl.
CPC .............. *B65G 61/00* (2013.01); *B25J 9/026* (2013.01); *B25J 9/1697* (2013.01); *B25J 15/0616* (2013.01)

(58) Field of Classification Search
None
See application file for complete search history.

(56) References Cited

U.S. PATENT DOCUMENTS

2013/0096713 A1* 4/2013 Takizawa ............. B25J 15/0616 700/224
2015/0344225 A1 12/2015 Nakamura et al.
(Continued)

FOREIGN PATENT DOCUMENTS

CN 103085075 A 5/2013
CN 104220220 A 12/2014
(Continued)

OTHER PUBLICATIONS

Japanese Office Action issued Aug. 26, 2025 in Japanese Patent Application No. 2021-183548, (with unedited computer-generated English translation), 14 pages.
(Continued)

*Primary Examiner* — Daniel L Greene
(74) *Attorney, Agent, or Firm* — Oblon, McClelland, Maier & Neustadt, L.L.P.

(57) ABSTRACT

According to one embodiment, a cargo handling apparatus includes a hand, a robot arm, a transfer device, a measurement device, and a control device. The hand holds an article. The robot arm moves the hand. The transfer device is arranged with the robot arm, and transfers the article. The measurement device measures a position and a size of the article. The control device performs a first operation of transferring the article to the transfer device by using the hand and the robot arm, and a second operation of transferring the transferred article by using the transfer device. The control device determines whether or not the robot arm will interfere with the transfer device or a second article on the transfer device when performing the first operation for a first article. The control device controls a start timing of the first operation according to a determination result of the interference.

19 Claims, 17 Drawing Sheets

(51) Int. Cl.
*B25J 9/16* (2006.01)
*B25J 15/06* (2006.01)

(56) References Cited

U.S. PATENT DOCUMENTS

| | | | | |
|---|---|---|---|---|
| 2017/0137236 | A1 | 5/2017 | Sonoura et al. | |
| 2018/0072512 | A1 | 3/2018 | Sonoura et al. | |
| 2020/0030976 | A1 | 1/2020 | Diankov | |
| 2021/0107748 | A1* | 4/2021 | Ishioka | B65G 47/912 |
| 2021/0122039 | A1 | 4/2021 | Su et al. | |
| 2021/0269262 | A1 | 9/2021 | Mori et al. | |
| 2022/0288793 | A1* | 9/2022 | Yamane | B25J 15/0066 |

FOREIGN PATENT DOCUMENTS

| | | | |
|---|---|---|---|
| CN | 112578743 | A | 3/2021 |
| JP | 2015-224125 | A | 12/2015 |
| JP | 2018-34991 | A | 3/2018 |
| JP | 6591639 | B1 | 10/2019 |
| WO | WO 2020/054771 | A1 | 3/2020 |

OTHER PUBLICATIONS

Combined Chinese Office Action and Search Report issued on Dec. 27, 2025 in Chinese Patent Application No. 202211404709.9 (with unedited computer-generated English translation), 19 pages.

* cited by examiner

CARGO HANDLING APPARATUS, CONTROL DEVICE, CARGO HANDLING METHOD, AND STORAGE MEDIUM

CROSS-REFERENCE TO RELATED APPLICATIONS

This application is based upon and claims the benefit of priority from Japanese Patent Application No. 2021-183548, filed on Nov. 10, 2021; the entire contents of which are incorporated herein by reference.

FIELD

Embodiments described herein relate generally to a cargo handling apparatus, a control device, a cargo handling method, and a storage medium.

BACKGROUND

There is a cargo handling apparatus that performs cargo handling tasks. Cargo handling apparatus technology that can more efficiently perform cargo handling tasks is desirable.

DETAILED DESCRIPTION

Figure 1:
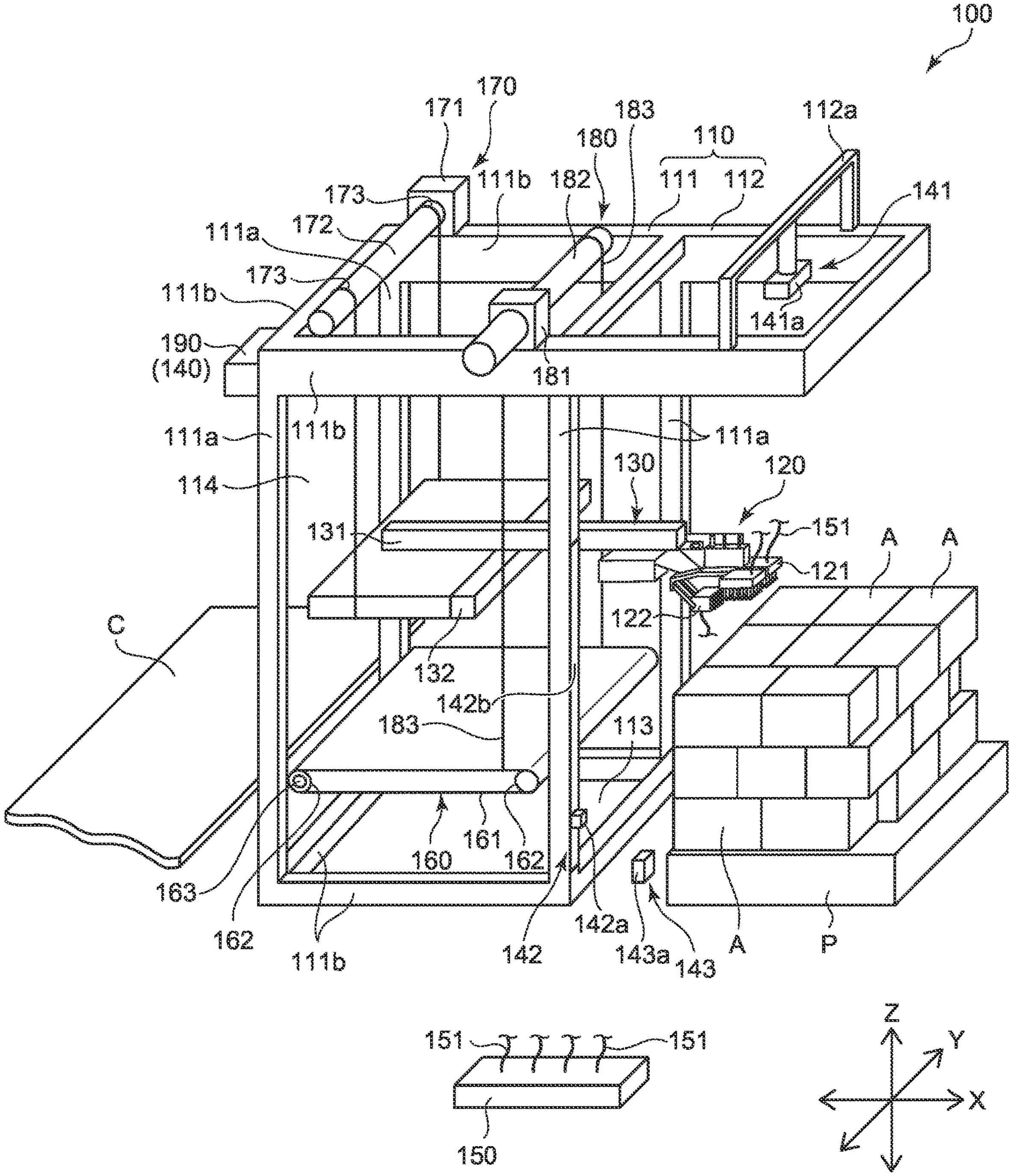
FIG. 1 is a perspective view schematically showing a cargo handling apparatus according to an embodiment.

According to one embodiment, a cargo handling apparatus includes a hand, a robot arm, a transfer device, a measurement device, and a control device. The hand holds an article. The robot arm moves the hand. The transfer device is arranged with the robot arm in a first direction, and transfers the article. The measurement device measures a position and a size of the article. The control device performs a first operation of transferring the article to the transfer device by using the hand and the robot arm, and a second operation of transferring the transferred article by using the transfer device. The control device determines, based on a measurement result of the measurement device, whether or not the robot arm will interfere with the transfer device or a second article on the transfer device when performing the first operation for a first article. The control device controls a start timing of the first operation according to a determination result of the interference.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a perspective view schematically showing a cargo handling apparatus according to an embodiment.

The cargo handling apparatus 100 according to the embodiment is installed in a site where cargo handling tasks of articles are performed. For example, cargo handling tasks include unloading and loading. As an example, a transfer device C that transfers an article A is installed next to the cargo handling apparatus 100. The transfer device C is, for example, a belt conveyor, a roller conveyor, a chain conveyor, etc. Also, a pallet P on which the article A is loaded is placed next to the cargo handling apparatus 100. The cargo handling apparatus 100 is positioned between the transfer device C and the pallet P. The cargo handling apparatus 100 moves the article A placed on the pallet P to the transfer device C.

As shown in FIG. 1, the cargo handling apparatus 100 includes a support frame 110, a hand 120, a robot arm 130, a measurement device 140, a negative-pressure generation device 150, a transfer device 160, a moving device 170, a moving device 180, and a control device 190.

Herein, an XYZ coordinate system is used in the description. An X-direction (a second direction) and a Y-direction (a third direction) cross each other. A Z-direction (a first direction) crosses the X-Y plane (a first plane). For example, the Z-direction is parallel to the vertical direction; and the X-direction, the Y-direction, and the Z-direction are orthogonal to each other.

The support frame 110 supports the components of the cargo handling apparatus 100. The hand 120 can hold an article. The robot arm 130 moves the hand 120 along the X-Y plane. The measurement device 140 recognizes the article and measures the position and size of the article. The transfer device 160 transfers the article A transferred by the hand 120 and the robot arm 130 toward the transfer device C. The moving device 170 moves the robot arm 130 in the Z-direction. The moving device 180 moves the transfer device 160 in the Z-direction. The control device 190 controls the operations of the components of the cargo handling apparatus 100.

One specific example of the components will now be elaborated.

The support frame 110 forms the contour of the cargo handling apparatus 100 and is fixed to the floor surface. The support frame 110 includes a main part 111 and a protruding part 112. The main part 111 has a rectangular parallelepiped shape. The transfer device 160 is located inside the main part 111. The main part 111 has an opening 113 facing the pallet P side and an opening 114 facing the transfer device C side. The article A is transferred from the pallet P to the transfer device 160 via the opening 113. Also, the article A is transferred from the transfer device 160 to the transfer device C via the opening 114.

The main part 111 includes, for example, four vertical frames **111*a* and multiple horizontal frames 111*b* that link the upper ends of the four vertical frames 111*a* to each other and the lower ends of the four vertical frames 111*a* to each other. The protruding part 112 is mounted frontward of the upper portion of the main part 111 and protrudes frontward. The protruding part 112** is positioned above the pallet P.

The hand 120 holds (stably grips) the article by suction-gripping, pinching, or jamming. In the illustrated example, the hand 120 includes an upper surface suction-gripping unit 121 (a first suction-gripping unit) and a side surface suction-gripping unit 122 (a second suction-gripping unit) for suction-gripping the article.

The robot arm 130 is an orthogonal robot. The robot arm 130 includes a first linear unit 131 and a second linear unit 132. The first linear unit 131 is linked to the hand 120 and can extend and retract or slide along the X-direction. The hand 120 can be moved along the X-direction by the operation of the first linear unit 131. The second linear unit 132 extends along the Y-direction and movably supports the first linear unit 131 from below. The second linear unit 132 moves the first linear unit 131 along the Y-direction. The hand 120 can be moved along the Y-direction by the operation of the second linear unit 132. The first linear unit 131 and the second linear unit 132 are operated by actuators such as motors, air cylinders, etc.

The robot arm 130 is not limited to the illustrated example and may be a vertical articulated robot, a horizontal articulated robot, a linear robot, or a parallel link robot. The robot arm 130 may include a combination of at least two selected from a vertical articulated robot, a horizontal articulated robot, a linear robot, an orthogonal robot, and a parallel link robot.

The measurement device 140 includes a first measuring instrument 141, a second measuring instrument 142, and a third measuring instrument 143. The article that is placed on the pallet P is measured by the first measuring instrument 141 in the Z-direction. The article is measured by the second measuring instrument 142 in a direction crossing the Z-direction. The third measuring instrument 143 measures the Z-direction position of the bottom surface of the transferred article.

Specifically, the first measuring instrument 141 includes an imaging part **141*a*. The imaging part 141*a* is fixed to a support part 112*a* included in the protruding part 112. The imaging part 141*a* includes one or two selected from an image sensor and a distance sensor. The article A that is placed on the pallet P is imaged from above by the imaging part 141*a*. The imaging part 141*a* transmits the acquired image (still image) to the control device 190. The imaging part 141*a*** may acquire a video image. In such a case, a still image is cut out from the video image.

The control device 190 calculates data related to the article based on the image acquired by the imaging part **141*a*. The calculated data includes the recognition result of the upper surface of the article A in the image, the position of the upper surface in the X-direction, the Y-direction, and the Z-direction, the X-direction length of the upper surface, the Y-direction length of the upper surface, the surface area of the upper surface, etc. The imaging part 141*a* and the control device 190 function as the first measuring instrument 141. An image recognition system other than the control device 190 may be embedded in the imaging part 141*a* and used as the first measuring instrument 141**.

The second measuring instrument 142 includes a distance sensor **142*a*. The distance sensor 142*a* measures the distance to the article in a direction crossing the Z-direction. In the illustrated example, the second measuring instrument 142 is located at one of the multiple vertical frames 111*a* and measures the distance to the article in a direction that is perpendicular to the Z-direction and oblique to the X-direction and the Y-direction. The distance sensor 142*a* emits an infrared ray, laser light, or an ultrasonic wave toward the article. From the perspective of the measurement accuracy of the distance, it is favorable for the distance sensor 142*a* to be a laser rangefinder (LRF) using laser light. Based on the measurement result of the distance sensor 142*a*, the control device 190 calculates the recognition result of the side surface of the article A, the position in the X-Y plane of the side surface of the article A, etc. The distance sensor 142*a* and the control device 190 function as the second measuring instrument 142**.

The second measuring instrument 142 may include a moving device **142*b*. The moving device 142*b* moves the distance sensor 142*a* along the Z-direction. In such a case, the control device 190 can measure the positions of the upper surfaces of the articles in the Z-direction, the positions of the lower surfaces of the articles in the Z-direction, the levels (the Z-direction positions) of the articles, etc., based on the measurement result of the distance sensor 142*a* and the movement amount of the moving device 142*b***.

Similarly to the first measuring instrument 141, the second measuring instrument 142 may include an imaging part. The article A that is placed on the pallet P is imaged from the side by the imaging part. The imaging part transmits the acquired image to the control device 190. The control device 190 calculates the recognition result of the side surface of the article A, the position in the X-Y plane of the side surface of the article A, the height of the article A, etc., based on the image. In such a case, the imaging part and the control device 190 function as the second measuring instrument 142.

The third measuring instrument 143 includes a distance sensor **143*a* installed between the main part 111 and the pallet P. The distance sensor 143*a* measures the distance to the bottom surface of the article A passing above the distance sensor 143*a*. The control device 190 measures the Z-direction position of the bottom surface of the article A based on the measurement result of the distance sensor 143*a*. Favorably, the distance sensor 143***a* is a LRF using laser light. The distance sensor 143*a* and the control device 190 function as the third measuring instrument 143.

Similarly to the first measuring instrument 141, the third measuring instrument 143 may include an imaging part. The imaging part is installed between the main part 111 and the pallet P and images, from below, the article A passing above the imaging part. The imaging part transmits the acquired image to the control device 190. The control device 190 calculates the Z-direction position of the bottom surface of the article A based on the image. In such a case, the imaging part and the control device 190 function as the third measuring instrument 143.

The negative-pressure generation device 150 can individually adjust the pressure of the upper surface suction-gripping unit 121 and the pressure of the side surface suction-gripping unit 122. The negative-pressure generation device 150 includes multiple pipes 151 connected to the upper surface suction-gripping unit 121 and the side surface suction-gripping unit 122. The negative-pressure generation device 150 also includes a not-illustrated vacuum pump, ejectors, valves, etc.

The transfer device 160 is, for example, a belt conveyor. The transfer device 160 includes a belt 161, pulleys 162, and a driver 163. The belt 161 is an endless belt threaded over a pair of the pulleys 162 separated from each other in the X-direction. One end of the belt 161 is next to the transfer device C. The rotation axes of the pulleys 162 are parallel to the Y-direction. The driver 163 drives the belt 161 by rotating one of the pair of pulleys 162. The article A that is placed on the transfer device 160 is transferred toward the transfer device C by the driving of the belt 161. Other than the illustrated example, the transfer device 160 may be a roller conveyor, a chain conveyor, etc.

The moving device 170 moves the robot arm 130 along the Z-direction. The moving device 170 includes a driver 171, a shaft 172, and a wire 173. The driver 171 is mounted to the upper end of the main part 111. The shaft 172 extends along the Y-direction and is linked to the driver 171. The wire 173 is wound around the shaft 172. One end of the wire 173 is linked to the robot arm 130. The driver 171 rotates the shaft 172. The robot arm 130 is moved along the Z-direction according to the rotation of the shaft 172 by the wire 173 winding or unwinding.

Here, in the example of the description, the moving device 170 is located separately from the robot arm 130. The moving device 170 may be included in the robot arm 130 as an axis for providing a Z-direction degree of freedom.

The moving device 180 includes a driver 181, a shaft 182, and a wire 183. The driver 181 is mounted to the upper end of the main part 111. The shaft 182 extends along the Y-direction and is linked to the driver 181. The wire 183 is wound around the shaft 182. One end of the wire 183 is linked to the transfer device 160. The driver 181 rotates the shaft 182. The transfer device 160 is moved along the Z-direction according to the rotation of the shaft 182 by the wire 183 winding or unwinding.

The control device 190 is electrically connected with the hand 120, the imaging part 141*a*, the distance sensor 142*a*, the distance sensor 143*a*, the negative-pressure generation device 150, the driver 163, the driver 171, and the driver 181. The control device 190 controls the hand 120, the negative-pressure generation device 150, the driver 163, the driver 171, the driver 181, etc., based on the measurement result of the first measuring instrument 141, the measurement result of the second measuring instrument 142, and the measurement result of the third measuring instrument 143.

The cargo handling apparatus 100 performs a first operation and a second operation. In the first operation, the cargo handling apparatus 100 transfers the article A to the transfer device 160 by using the hand 120 and the robot arm 130. In the second operation, the article A that is transferred onto the transfer device 160 is transferred toward the transfer device C by the transfer device 160.

FIGS. 2A to 2C, FIG. 3A, and FIG. 3B are schematic views showing the first operation of the cargo handling apparatus according to the embodiment. FIGS. 4A and 4B are schematic views showing the second operation of the cargo handling apparatus according to the embodiment. Here, in the example of the description, the article is held by the hand 120 using only the upper surface suction-gripping unit 121. The side surface suction-gripping unit 122 is not illustrated in FIG. 2B and subsequent drawings.

For example, the article that has the upper surface at the highest position among the multiple articles placed on the pallet P is determined to be the holding object. When multiple articles have upper surfaces at the highest position, the article that is most proximate to the distance sensor 142*a* is determined to be the holding object.

Figure 2A:
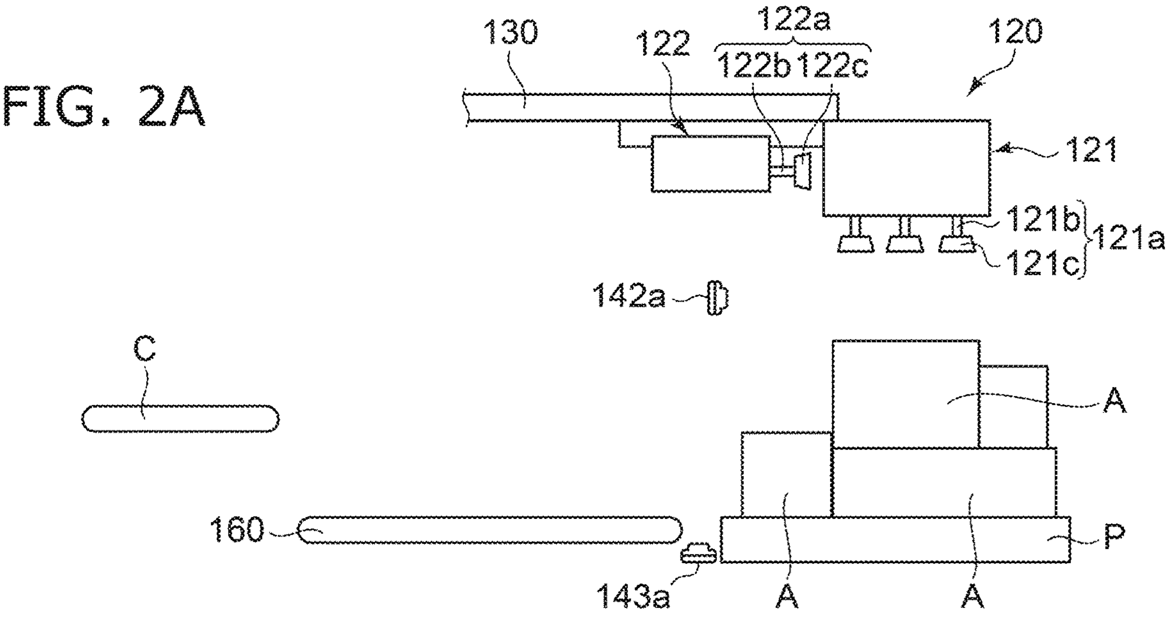
FIGS. 2A to 2C are schematic views showing a first operation of the cargo handling apparatus according to the embodiment.

As shown in FIG. 2A, the upper surface suction-gripping unit 121 includes multiple suction-gripping parts 121*a*. Each suction-gripping part 121*a* includes a rod 121*b* extending in the Z-direction and a pad 121*c* located at the tip of the rod 121*b*. The pad 121*c* is elastic to be deformable along the upper surface of the article. Similarly, the side surface suction-gripping unit 122 includes multiple suction-gripping parts 122*a*. Each suction-gripping part 122*a* includes a rod 122*b* extending in the X-direction and a pad 122*c* located at the tip of the rod 122*b*. The pad 122*c* is elastic to be deformable along the side surface of the article.

Figure 2B:
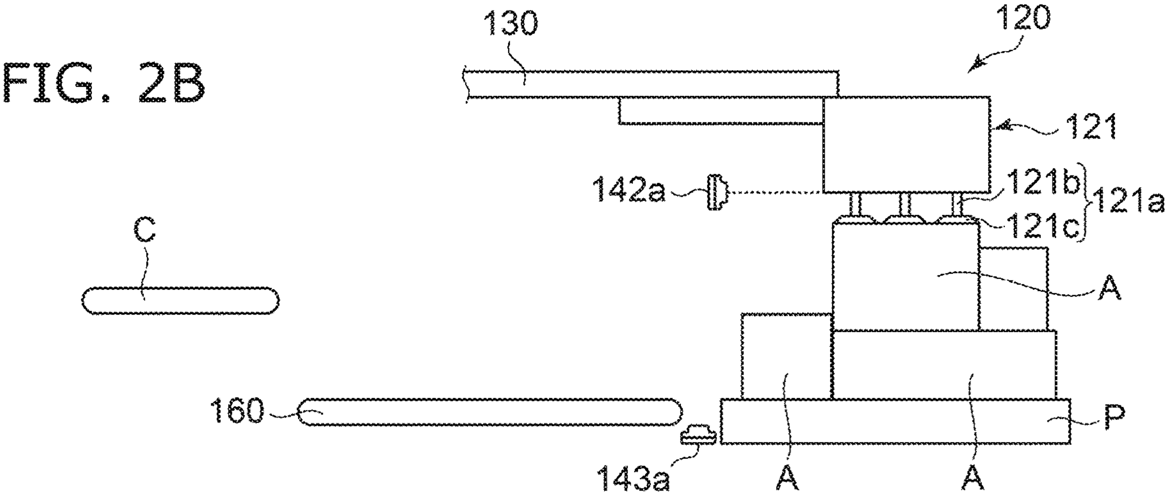
Figure 2C:
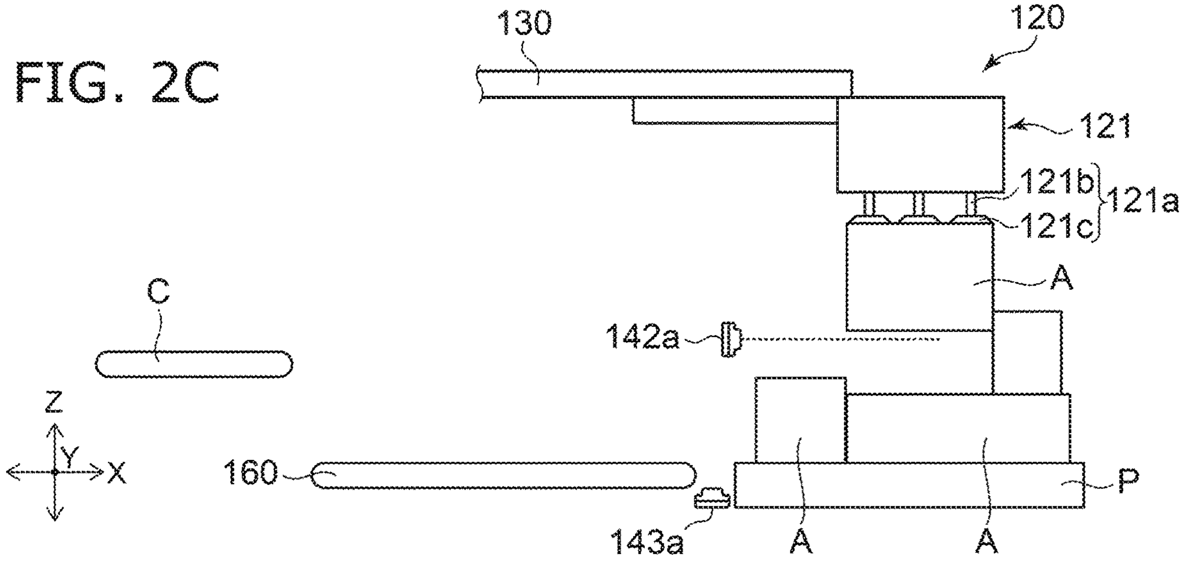

First, as shown in FIG. 2A, the robot arm 130 causes the hand 120 to lift the article A determined to be the holding object. For example, the side surface suction-gripping unit 122 is positioned backward of the upper surface suction-gripping unit 121. The moving device 170 lowers the hand 120 toward the article A. As shown in FIG. 2B, the upper surface suction-gripping unit 121 suction-grips the upper surface of the article A. At this time, the distance sensor 142*a* is positioned higher than the article that is held. As shown in FIG. 2C, the moving device 170 raises the hand 120 and the robot arm 130. The article A is raised thereby.

While raising the article A, the distance sensor 142*a* continues to measure the distance to the article that is held. The measured distance changes when the upper surface of the article A passes through the level of the distance sensor 142*a* and when the bottom surface of the article A passes through the level of the distance sensor 142*a*. The control device 190 measures the height of the article A that is held based on the change. The moving device 142*b* may lower the distance sensor 142*a* while raising the article A. The height of the article A can be more quickly measured by moving the distance sensor 142*a* in the direction opposite to the movement direction of the article.

Figure 3A:
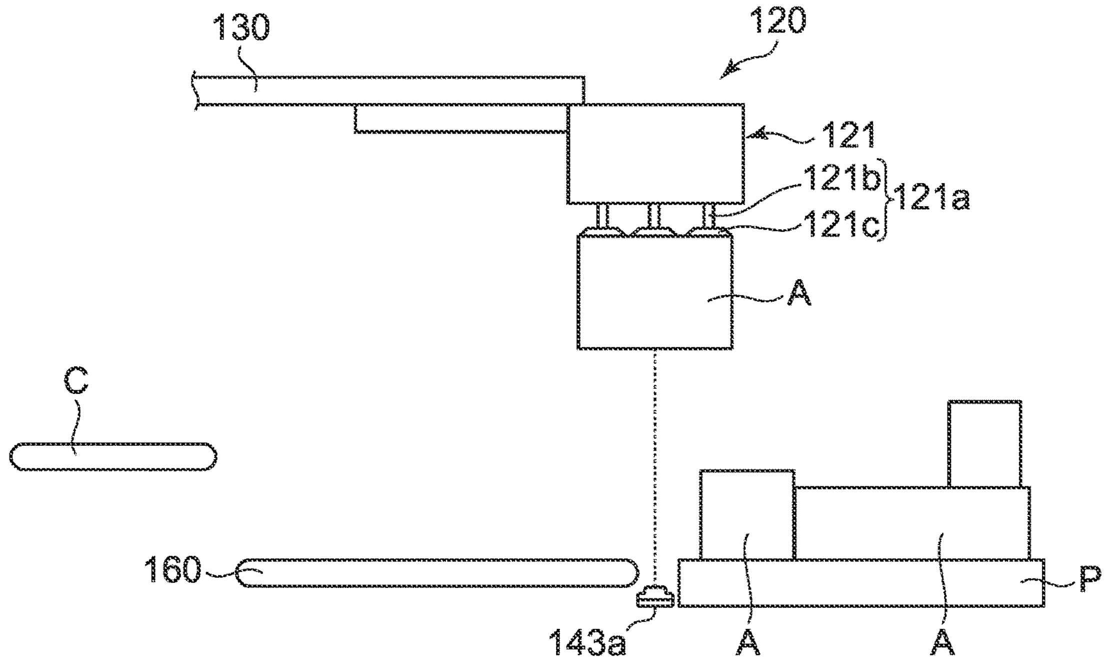
FIGS. 3A and 3B are schematic views showing the first operation of the cargo handling apparatus according to the embodiment.
Figure 3B:
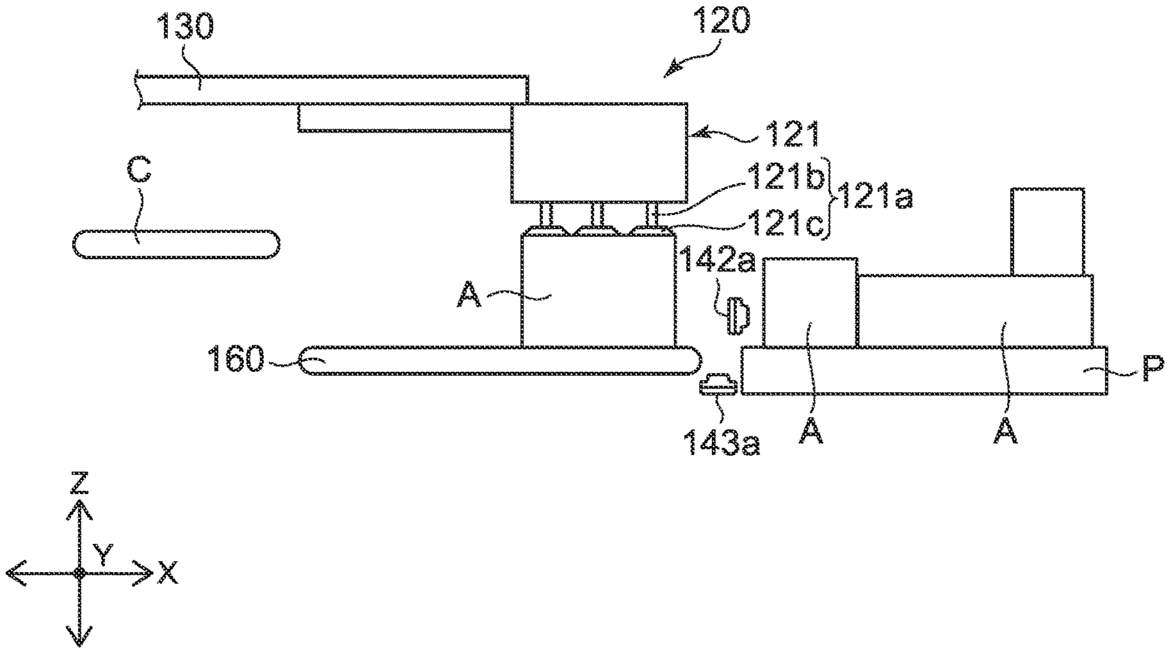
Figure 4A:
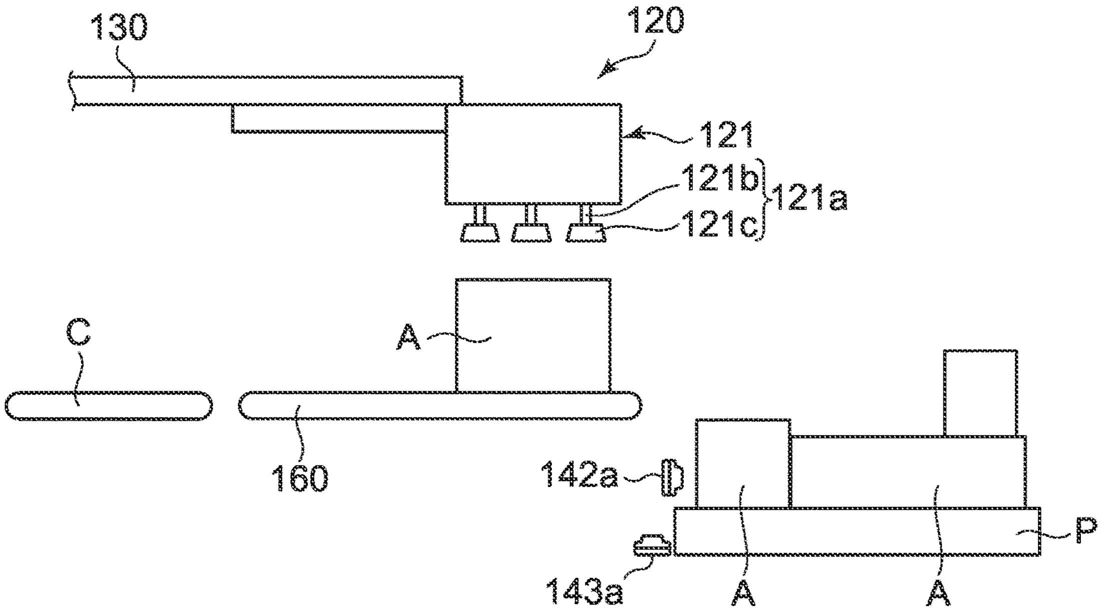
FIGS. 4A and 4B are schematic views showing a second operation of the cargo handling apparatus according to the embodiment.
Figure 4B:
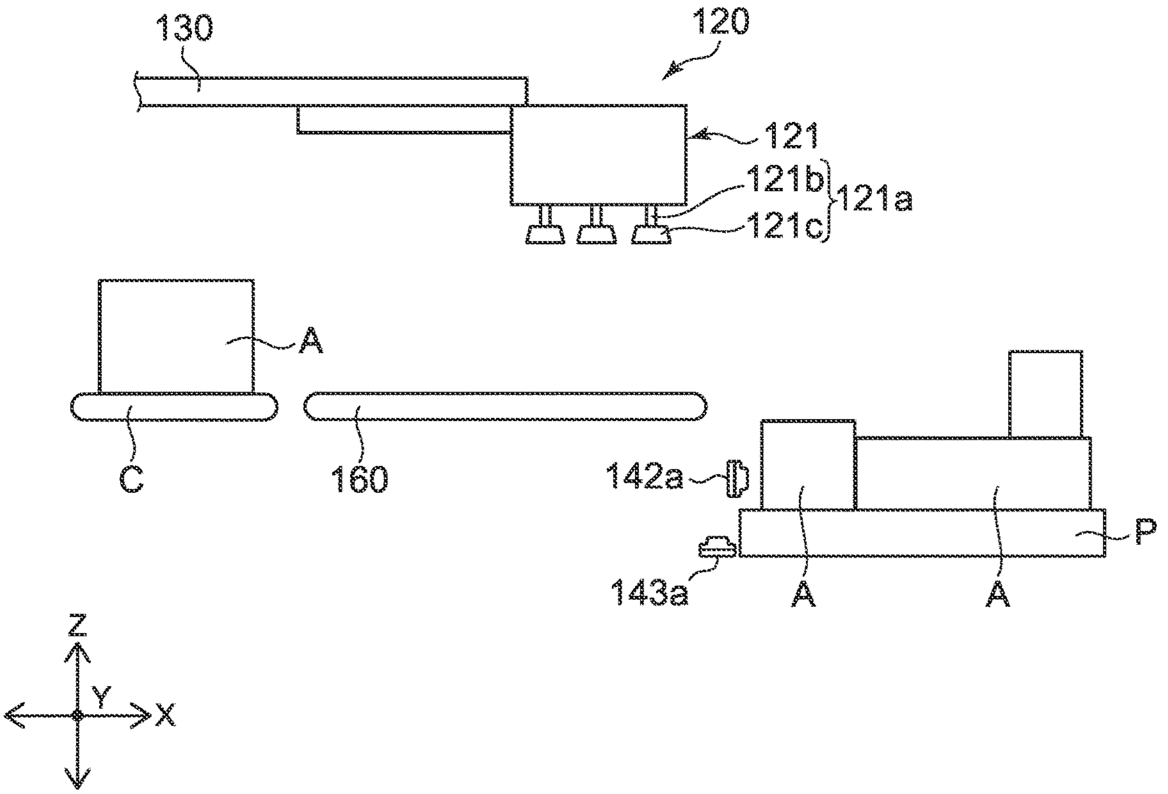

As shown in FIG. 3A, the robot arm 130 moves the hand 120 above the transfer device 160. At this time, the distance sensor 143*a* measures the distance to the bottom surface of the article A that is held. As shown in FIG. 3B, the moving device 170 lowers the hand 120 toward the transfer device 160 and places the article A that is held on the transfer device 160.

As shown in FIG. 4A, the hand 120 releases the holding of the article A. The moving device 170 shown in FIG. 1 raises the hand 120 and the robot arm 130. After raising the hand 120 and the robot arm 130, the moving device 180 shown in FIG. 1 raises the transfer device 160 and sets the Z-direction position of the transfer device 160 to be the same position as the transfer device C. As shown in FIG. 4B, the transfer device 160 transfers the article A that is transferred to the transfer device C. The raising of the transfer device 160 may be performed while transferring the article A. The start timing of the second operation can be accelerated thereby.

For example, the cargo handling task (the first operation and the second operation) is repeated until all of the articles A on the pallet P are transferred to the transfer device C. For example, the first operation and the second operation are alternately repeated. The next first operation is performed after completing one second operation. To increase the efficiency of the cargo handling task, it is favorable to perform at least a portion of the first operation of the next article in parallel with the second operation of the previous article. On the other hand, the robot arm 130 and the transfer device 160 of the cargo handling apparatus 100 are arranged in the vertical direction to downsize the cargo handling apparatus 100. The transfer device 160 is positioned below the robot arm 130. Therefore, there is a possibility that the robot arm 130 may interfere with the transfer device 160 when the first operation is performed in parallel with the second operation.

"Interference" is, for example, contact of the robot arm 130 with another object. "Interference" may include the distance between the robot arm 130 and the other object falling below a margin set for safety.

For the problems described above, the control device 190 determines, based on the measurement result of the measurement device 140, whether or not the robot arm 130 will interfere with the transfer device 160 or another article (a second article) on the transfer device 160 when performing the first operation of one article (a first article). Then, the control device 190 controls the start timing of the first operation according to the determination result of the interference. For example, when the interference will not occur, the control device 190 accelerates the start timing of the first operation for the first article compared to when the interference will occur.

Figure 5:
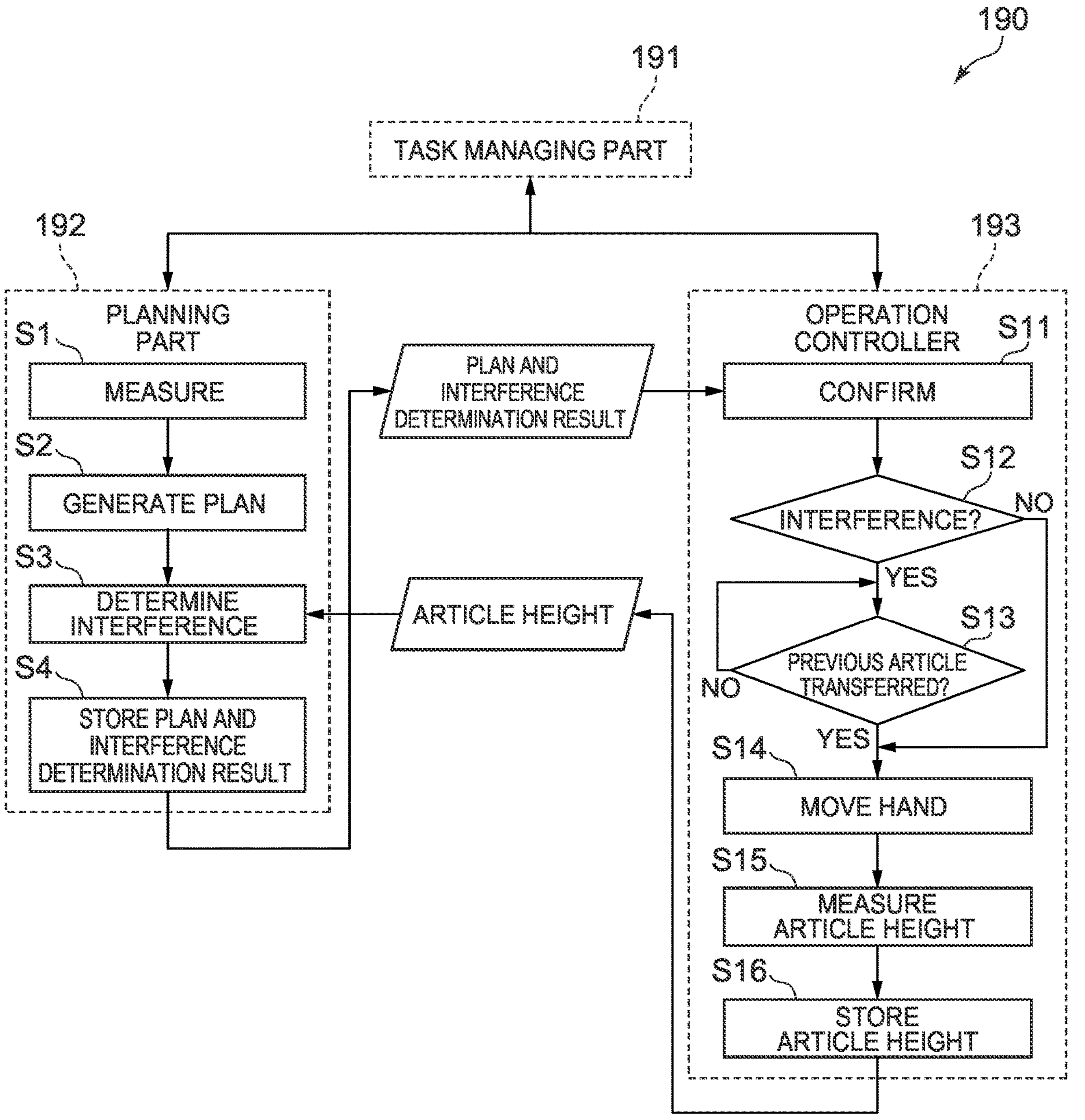
FIG. 5 is a schematic view showing a function of the control device of the cargo handling apparatus according to the embodiment.

FIG. 5 is a schematic view showing a function of the control device of the cargo handling apparatus according to the embodiment.

A method for controlling the start timing of the first operation will now be described with reference to FIG. 5. The control device 190 functions as a task managing part 191, a planning part 192, and an operation controller 193.

The task managing part 191 manages general tasks of the cargo handling task. The task managing part 191 requests the planning part 192 to generate a plan related to the cargo handling task. Also, the task managing part 191 requests the operation controller 193 to control the operation of the cargo handling apparatus 100 for the cargo handling task.

The planning part 192 causes the first measuring instrument 141 and the second measuring instrument 142 to measure the article placed on the pallet (step S1). The planning part 192 acquires the position of the upper surface of the article, the shape of the upper surface of the article, the position of the side surface of the article, etc., from the measurement. The planning part 192 generates a plan based on the measurement result (step S2). The plan includes the article that is held, the position of the article held by the hand 120, the operation path of the robot arm 130, etc. The operation path includes the path to the holding position and the path from the holding position to the transfer device 160 when transferring the article.

The planning part 192 determines whether or not the robot arm 130 will interfere with the transfer device 160 or the article on the transfer device 160 when the robot arm 130 operates along the operation path or when the hand 120 is at the holding position (step S3). When determining the interference, the transfer device 160 is assumed to be at the same level as the transfer device C. The planning part 192 stores the plan and the determination result of the interference (step S4).

The operation controller 193 confirms the plan and the interference determination result stored by the planning part 192 according to a request from the task managing part 191 (step S11). The operation controller 193 determines whether or not interference of the robot arm 130 with the transfer device 160 or the article on the transfer device 160 is determined to occur in the interference determination result (step S12). Thereafter, the determination that the determination result of the operation controller 193 determines interference to occur in the interference determination result also is called simply "interference occurs" or "interferes". The determination that the interference determination result determines interference not to occur also is called simply "interference does not occur" or "does not interfere". When interference will occur, the operation controller 193 determines whether or not the previous article on the transfer device 160 has been transferred by the transfer device 160 (step S13). The "previous article" is the article transferred to the transfer device 160 by the first operation before the first operation for the article for which holding is planned. When the previous article has not yet been transferred from the transfer device 160, the operation controller 193 causes the robot arm 130 to standby until the previous article is transferred from the transfer device 160.

When interference will not occur, the operation controller 193 moves the hand 120 by operating the robot arm 130 (step S14). The robot arm 130 moves along the planned operation path. The hand 120 moves to the planned holding position. The first operation is started when the hand 120 is moved to the holding position. In other words, the target article is held and transferred to the transfer device 160. In the first operation, the operation controller 193 causes the second measuring instrument 142 to measure the height of the article that is held (step S15). The operation controller 193 stores the height of the measured article (step S16). The stored height is utilized when determining the interference related to the next article.

FIGS. 6A to 6C, FIG. 7A, and FIG. 7B are schematic views showing operations of the cargo handling apparatus corresponding to the control of the start timing.

Figure 6A:
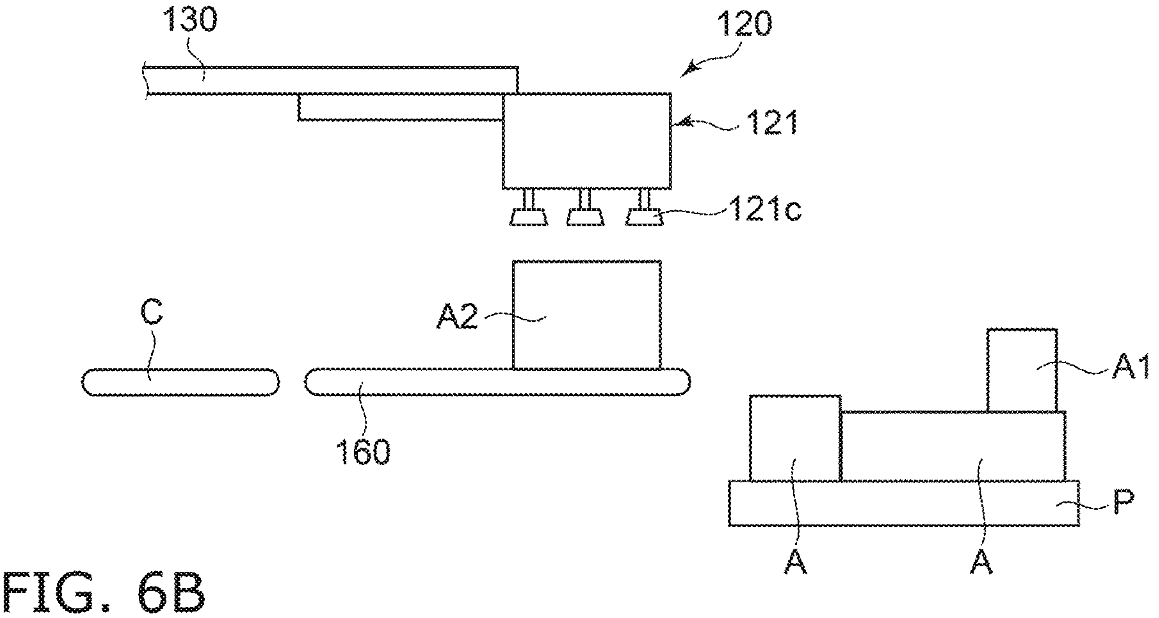
FIGS. 6A to 6C are schematic views showing operations of the cargo handling apparatus corresponding to the control of the start timing.
Figure 6B:
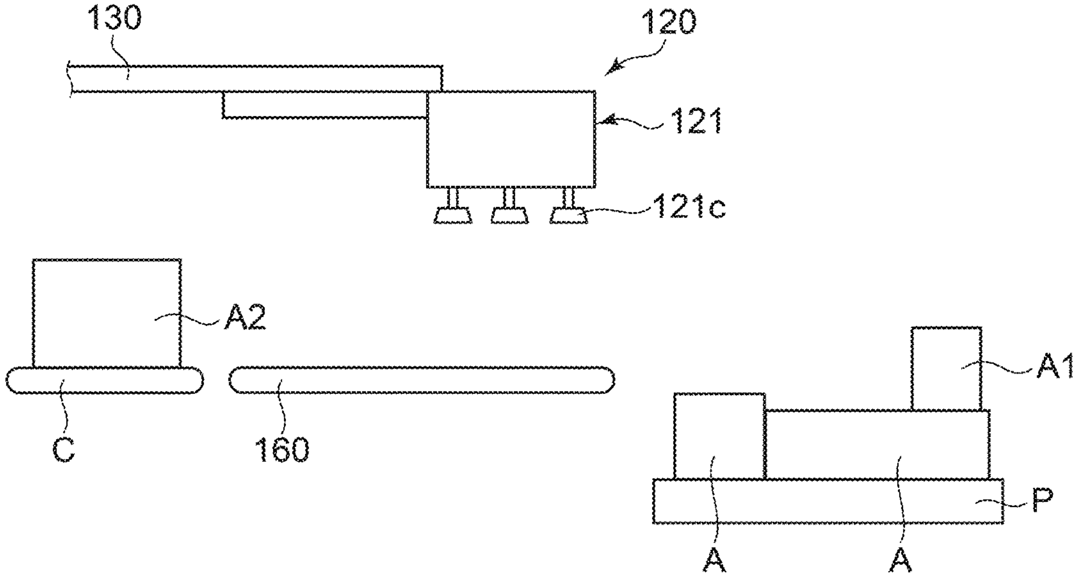
Figure 6C:
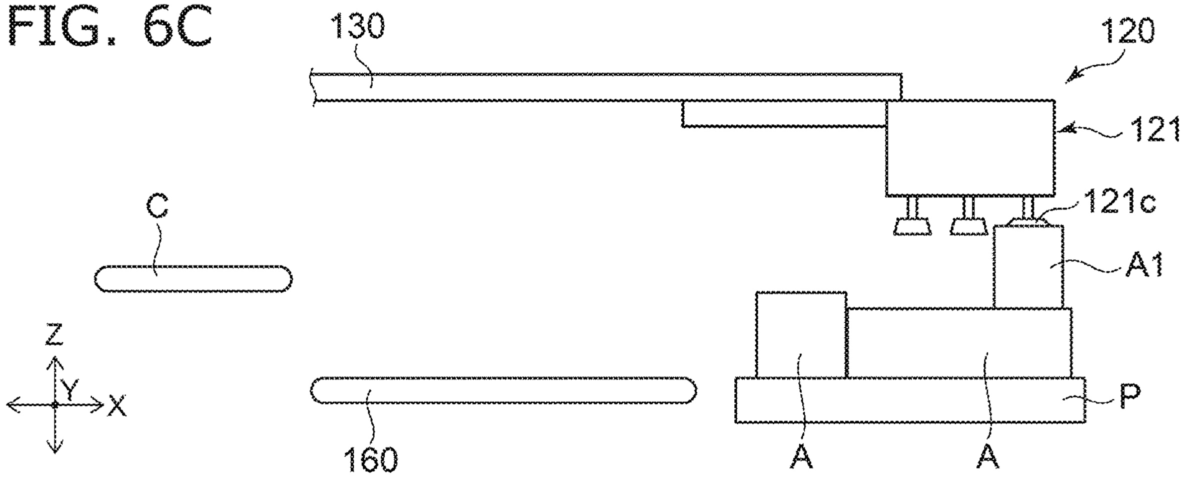

For example, in the state shown in FIG. 6A, an article A1 (an example of the first article) is determined to be the holding object. An article A2 (an example of the second article) is transferred by the transfer device 160. The upper surface of the article A1 is positioned lower than the upper surface of the article A2. The robot arm 130 interferes with the article A2 when the hand 120 holds the article A1. Therefore, interference is determined to occur in steps S3 and S12. In such a case, as shown in FIG. 6B, the robot arm 130 and the moving device 170 do not operate until the article A2 is transferred by the transfer device 160. As shown in FIG. 6C, the robot arm 130 moves after the transfer device 160 transfers the article A2 and is lowered. In other words, the first operation for the article A1 is not started until the second operation for the article A2 is completed.

Figure 7A:
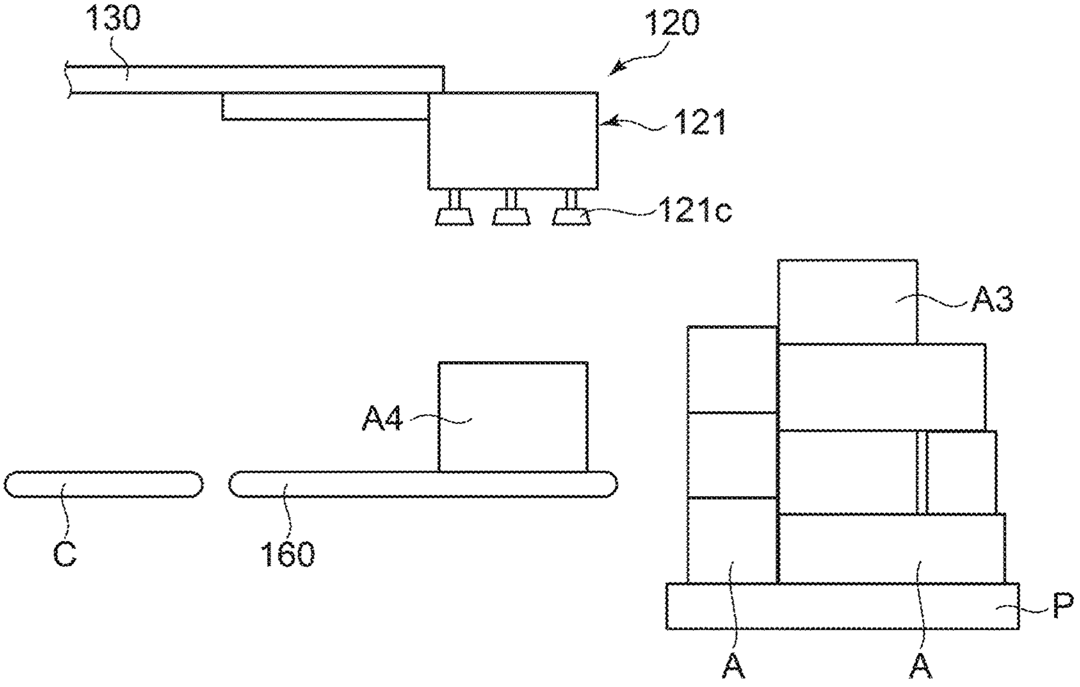
FIGS. 7A and 7B are schematic views showing operations of the cargo handling apparatus corresponding to the control of the start timing.
Figure 7B:
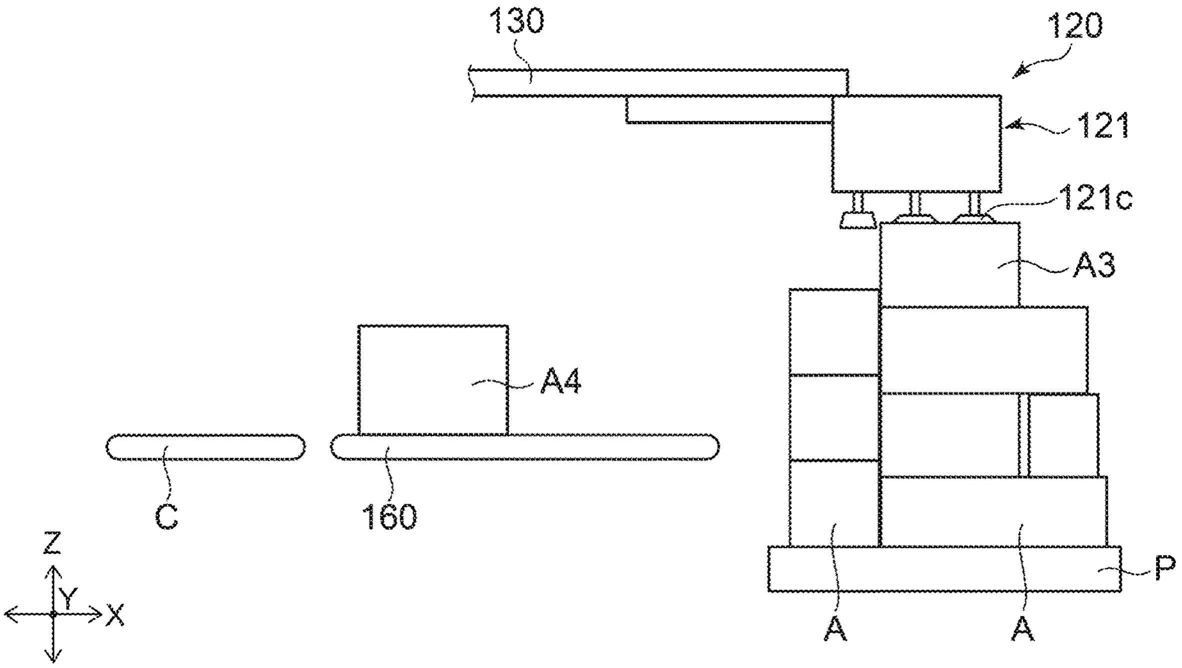

On the other hand, for example, in the state shown in FIG. 7A, an article A3 (an example of the first article) is determined to be the holding object. An article A4 (an example of the second article) is transferred by the transfer device 160. The article A3 is positioned higher than the article A4. The robot arm 130 does not interfere with the article A4 even when the hand 120 holds the article A3. Therefore, interference is determined not to occur in steps S3 and S12. In such a case, as shown in FIG. 7B, the robot arm 130 and the moving device 170 operate while the transfer device 160 transfers the article A4. In other words, the start timing of the first operation is earlier than the example shown in FIGS. 6A to 6C. As a result, the first operation for the article A3 is started while performing the second operation for the article A4. At least a portion of the first operation is performed in parallel with the second operation.

Advantages of the embodiment will now be described.

In the cargo handling apparatus 100 as described above, the start timing of the first operation is controlled according to the existence or absence of the interference of the robot arm 130 when performing the first operation. For example, when the interference of the robot arm 130 will not occur, the start timing of the first operation is earlier than when the interference of the robot arm 130 will occur. According to the embodiment, the efficiency of the cargo handling task of the cargo handling apparatus 100 can be further improved even when the cargo handling apparatus 100 is downsized by providing the transfer device 160 below the robot arm 130.

In the example shown in FIGS. 7A and 7B, it is unnecessary to lower the transfer device 160 to avoid interference with the robot arm 130. The time necessary to move the transfer device 160 can be reduced by omitting the lowering of the transfer device 160 and the raising of the transfer device 160 to the same level as the transfer device C; and the cargo handling task can have even higher efficiency.

Figure 8A:
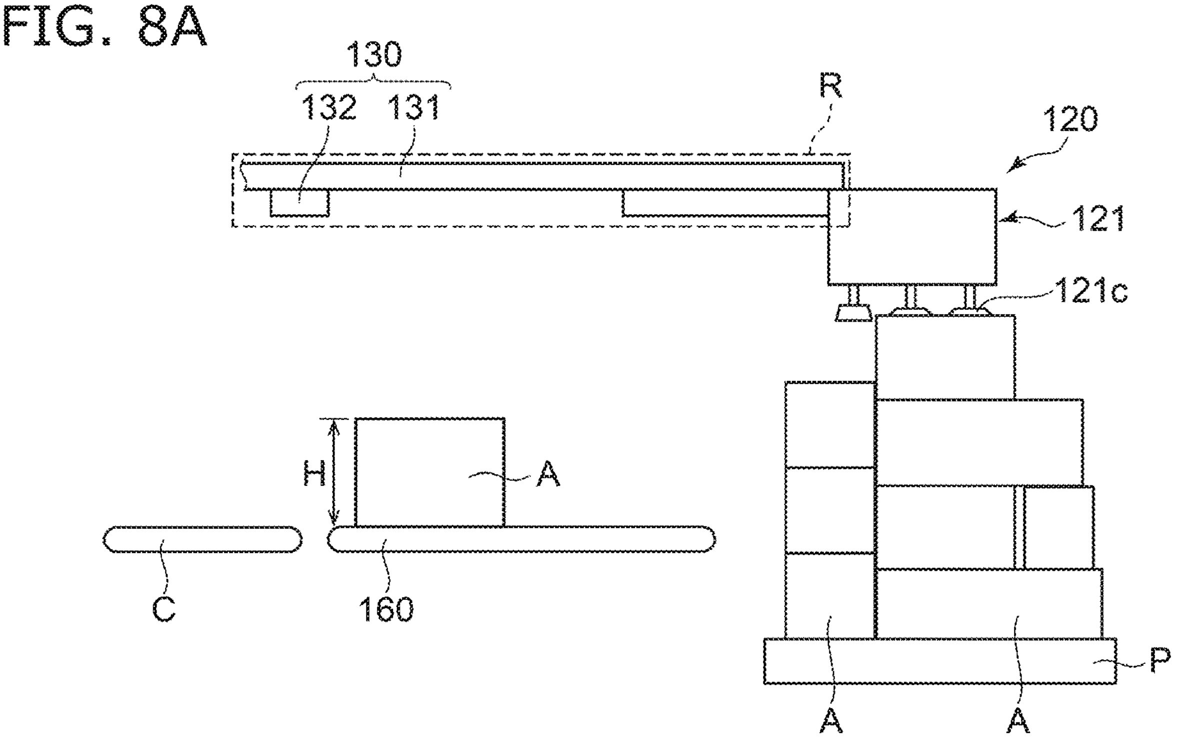
FIGS. 8A and 8B are schematic views for describing the determination method of the interference.
Figure 8B:
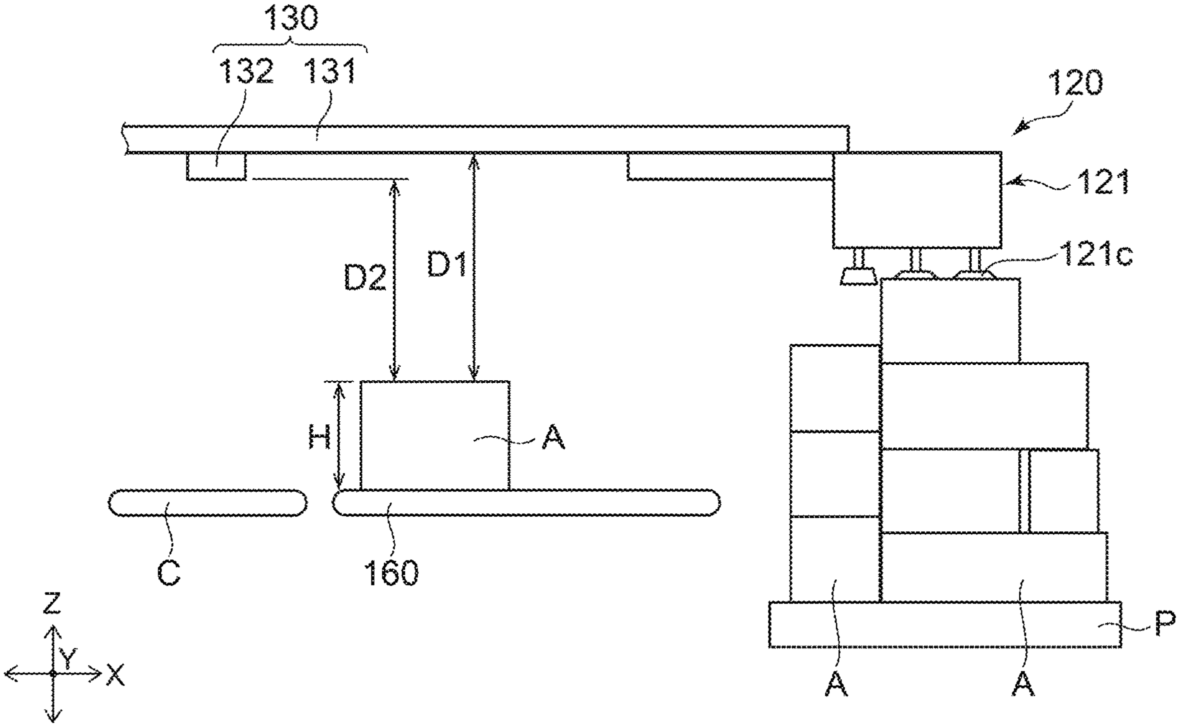

FIGS. 8A and 8B are schematic views for describing the determination method of the interference.

For example, as shown in FIG. 8A, the planning part 192 sets a virtual minimum rectangle R surrounding the robot arm 130 in the X-Z plane. The sides of the rectangle R are set to be parallel to the X-direction or the Z-direction. For example, the minimum rectangle R that circumscribes the robot arm 130 is set in the X-Z plane. The planning part 192 simply determines whether or not the robot arm 130 interferes with the transfer device 160 or the article on the transfer device 160 by determining whether or not the rectangle R interferes with the transfer device 160 or the article on the transfer device 160. According to this method, the calculation amount necessary for determining the interference can be reduced. For example, the end timing of the calculation by the planning part 192 can be earlier, and the processing by the operation controller 193 can be started earlier. As a result, the efficiency of the cargo handling task of the cargo handling apparatus 100 can be further improved.

A height H of the article used in the determination of the interference is based on the measurement result of the second measuring instrument 142. As described above, the distance sensor 142*a* measures the height H while the moving device 170 moves the article. By moving the distance sensor 142*a* in the direction opposite to the movement direction of the article, the height H of the article A can be more quickly measured. The start timing of the determination of the interference can be accelerated thereby. The end timing of the calculation by the planning part 192 can be earlier, and the processing by the operation controller 193 can be started earlier.

As shown in FIG. 8B, it may be determined whether or not the components of the robot arm 130 interfere with the transfer device 160 or the article on the transfer device 160 in the X-Z plane. For example, the control device 190 determines whether or not interference will occur for the components of the robot arm 130 by calculating a distance D1 between the article A and the first linear unit 131 of the robot arm 130, a distance D2 between the article A and the second linear unit 132 of the robot arm 130, etc. According to this method, the frequency of determining that interference will occur is less than that of the method shown in FIG. 8A. As a result, the frequency that the first operation is performed in parallel with the second operation can be increased, and the efficiency of the cargo handling task can be further improved.

First Modification

In the example shown in FIGS. 6A to 7B, the existence or absence of interference of the robot arm 130 with the transfer device 160 and the article on the transfer device 160 is determined by using only the positional relationship in the Z-direction. The existence or absence of interference also may be determined using the positional relationship in the Y-direction.

Figure 9:
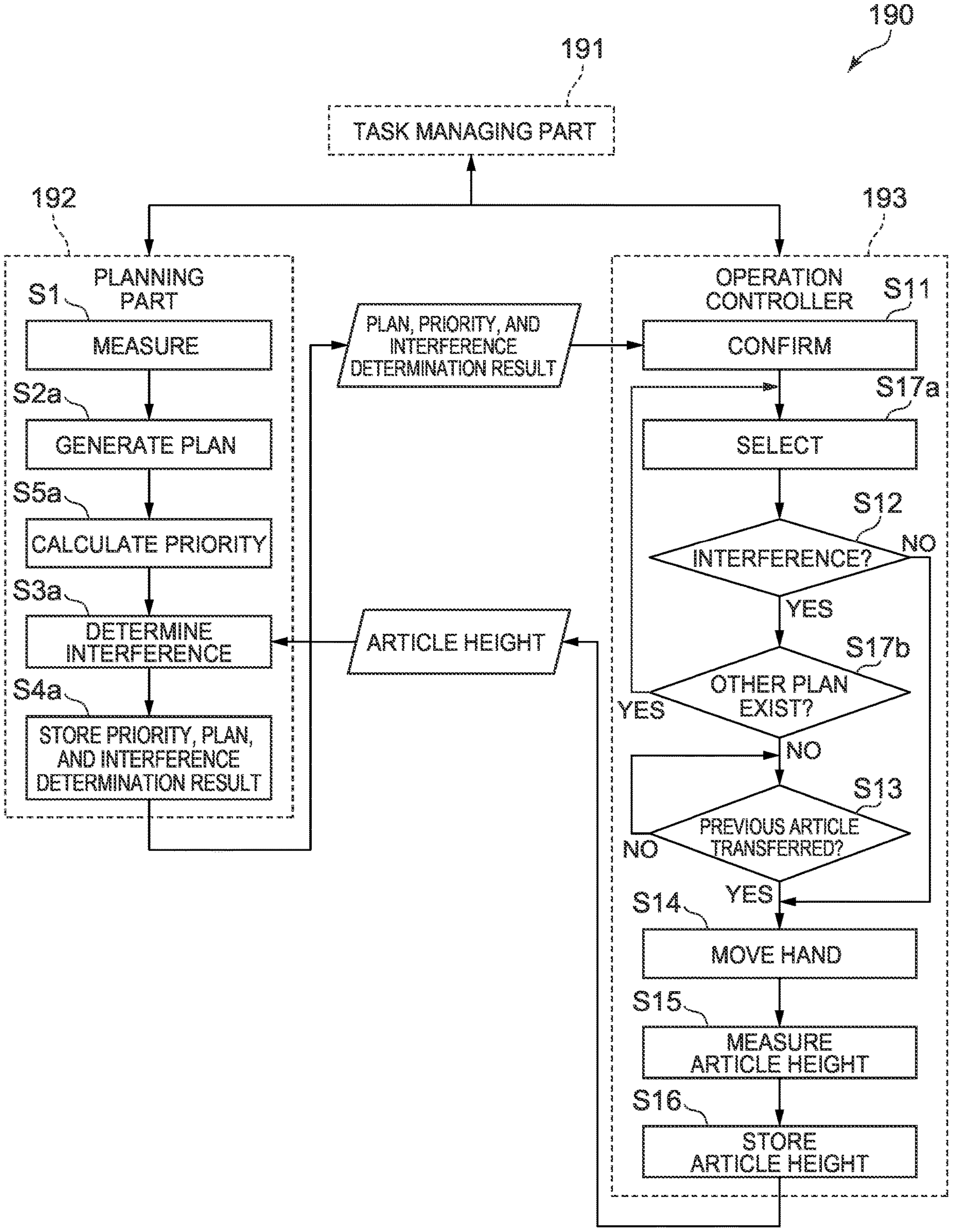
FIG. 9 is a schematic view showing a function of a control device of a cargo handling apparatus according to a first modification of the embodiment.

FIG. 9 is a schematic view showing a function of a control device of a cargo handling apparatus according to a first modification of the embodiment.

According to the first modification shown in FIG. 9, in step S2*a* after step S1, the planning part 192 generates plans for the articles that can be held. The planning part 192 calculates the priorities of the plans (step S5*a*). Then, in step S3*a*, the planning part 192 determines the interference of the robot arm 130 for the plans generated. Continuing in step S4*a*, the planning part 192 stores the plans, the priorities, and the interference determination results for the articles that can be held. For example, the priority for the plan is calculated to be higher for articles having upper surfaces at higher positions.

The operation controller 193 confirms the plans, the priorities, and the interference determination results in step S11. The operation controller 193 selects the plan among the multiple plans that has the highest priority (step S17*a*). The operation controller 193 determines whether or not the interference determination result related to the plan selected in step S12 determines that interference will occur. When interference will not occur, the selected plan is performed in step S14.

When interference will occur, the operation controller 193 determines whether or not there is another plan that has not yet been selected in step S17*a* (step S17*b*). When there is another plan, the operation controller 193 selects the plan having the next highest priority in step S17*a*. When there is no other plan, the operation controller 193 causes the robot arm 130 to standby until the previous article is transferred from the transfer device 160. Subsequently, the plan that has the highest priority is performed in step S14.

FIG. 10A, FIG. 10B, FIG. 11A, and FIG. 11B are schematic views showing an operation of the cargo handling apparatus according to the first modification of the embodiment.

Figure 10A:
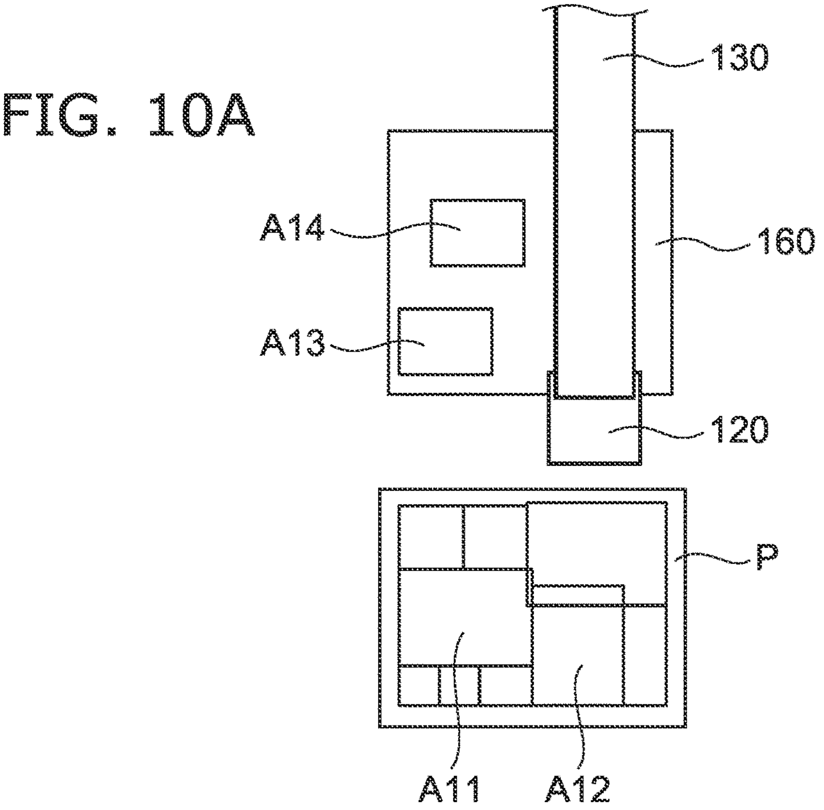
FIGS. 10A and 10B are schematic views showing an operation of the cargo handling apparatus according to the first modification of the embodiment.

In the state shown in FIG. 10A, multiple articles that include an article A11 and an article A12 are placed on the pallet P. Articles A13 and A14 are placed on the transfer device 160. The articles A11 to A14 are at the same level. For example, the article A11 is determined to be the holding object with the highest priority. The article A12 is determined to be the holding object with the highest priority after the article A11. The article A11 is an example of the first article. The article A12 is an example of the third article. The articles A13 and A14 are examples of the second article.

Figure 10B:
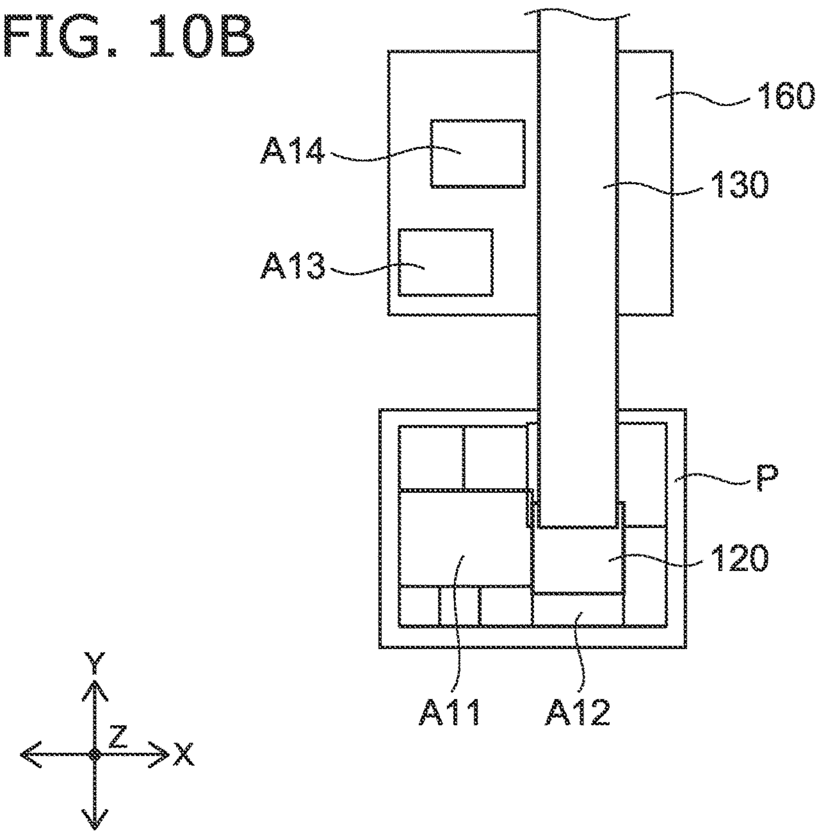

The Y-direction position of the article A11 is the same as the Y-direction positions of the articles A13 and A14. In other words, the article A11 overlaps the articles A13 and A14 when viewed along the X-direction. Therefore, the robot arm 130 interferes with the articles A13 and A14 when the hand 120 holds the article A11. The operation controller 193 determines whether or not the article A12 with the next highest priority can be held. The Y-direction position of the article A12 is different from the Y-direction positions of the articles A13 and A14. The article A11 does not overlap the article A13 or A14 when viewed along the X-direction. Therefore, the robot arm 130 will not interfere with the article A13 or A14 when the hand 120 holds the article A12. The operation controller 193 determines that the article A12 can be held without interference. According to the determination result, the operation controller 193 moves the hand 120 toward the article A12 as shown in FIG. 10B.

Figure 11A:
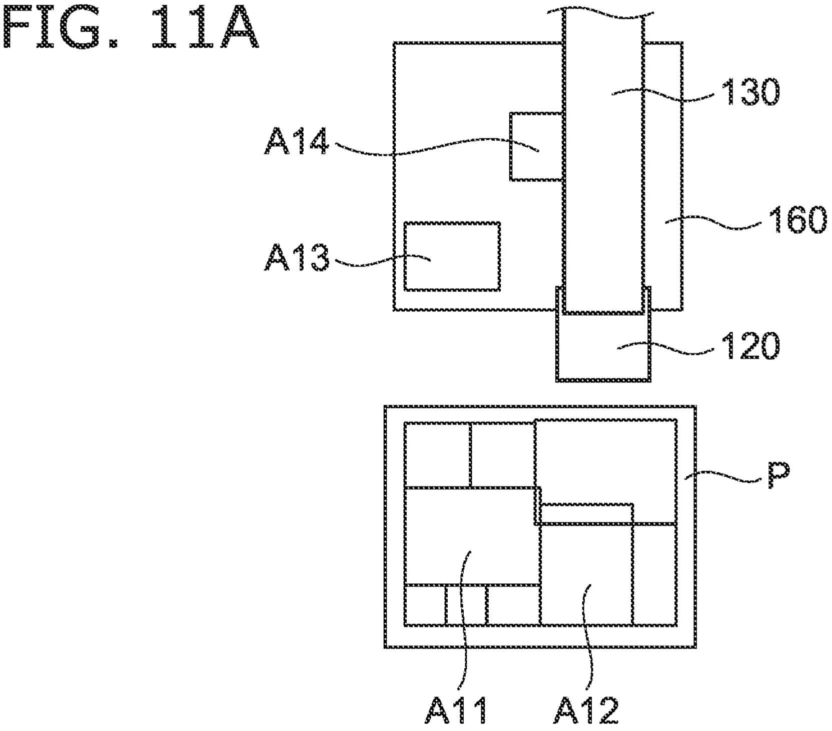
FIGS. 11A and 11B are schematic views showing an operation of the cargo handling apparatus according to the first modification of the embodiment.
Figure 11B:
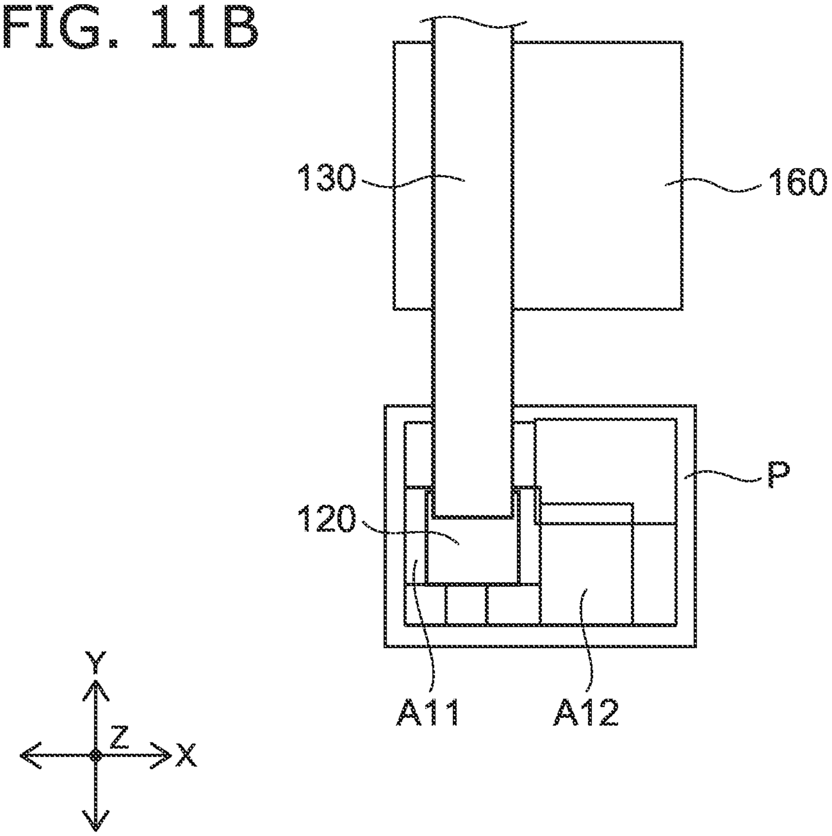

On the other hand, in the state shown in FIG. 11A, the Y-direction position of the article A11 is the same as the Y-direction position of the article A13. Also, the Y-direction position of the article A12 is the same as the Y-direction position of the article A14. When there are no candidates for the holding object other than the articles A11 and A12, the operation controller 193 determines that no article can be held without interference. As shown in FIG. 11B, the operation controller 193 moves the hand 120 toward the article A11 with the highest priority after the articles A13 and A14 are transferred by the transfer device 160.

The determination method of the interference based on the positional relationship in the Z-direction shown in FIG. 8A or FIG. 8B is applicable to determining the interference based on the positional relationship in the Y-direction. For example, the planning part 192 sets a virtual minimum rectangle surrounding the robot arm 130 in the X-Y plane. The planning part 192 determines whether or not the rectangle R interferes with the article on the transfer device 160. Or, the planning part 192 may determine whether or not the components of the robot arm 130 interfere with the article on the transfer device 160 in the X-Y plane.

Advantages of the first modification will now be described.

Even when the heights of the article that is held and the article on the transfer device 160 are the same, there are cases where the Y-direction positions of such articles are shifted as shown in FIG. 10A. By using the positional relationship in the Y-direction to determine the interference, the frequency that the first operation is performed in parallel with the second operation can be increased, and the efficiency of the cargo handling task can be further improved.

In the example shown in FIGS. 2A to 4B and FIGS. 6A to 7B, the hand 120 holds the article by using only the upper surface suction-gripping unit 121. The hand 120 may be able to switch between methods of holding the article. For example, the cargo handling apparatus 100 can switch between a first holding method and a second holding method. In the first holding method, the cargo handling apparatus 100 holds the article by using only the upper surface suction-gripping unit 121. In the second holding method, the cargo handling apparatus 100 holds the article by using both the upper surface and side surface suction-gripping units 121 and 122. In the example shown in FIGS. 2A to 4B and FIGS. 6A to 7B, the first operation is performed using the first holding method.

FIGS. 12A to 12C and FIGS. 13A to 13C are schematic views showing another operation of the cargo handling apparatus according to the embodiment.

Figure 12A:
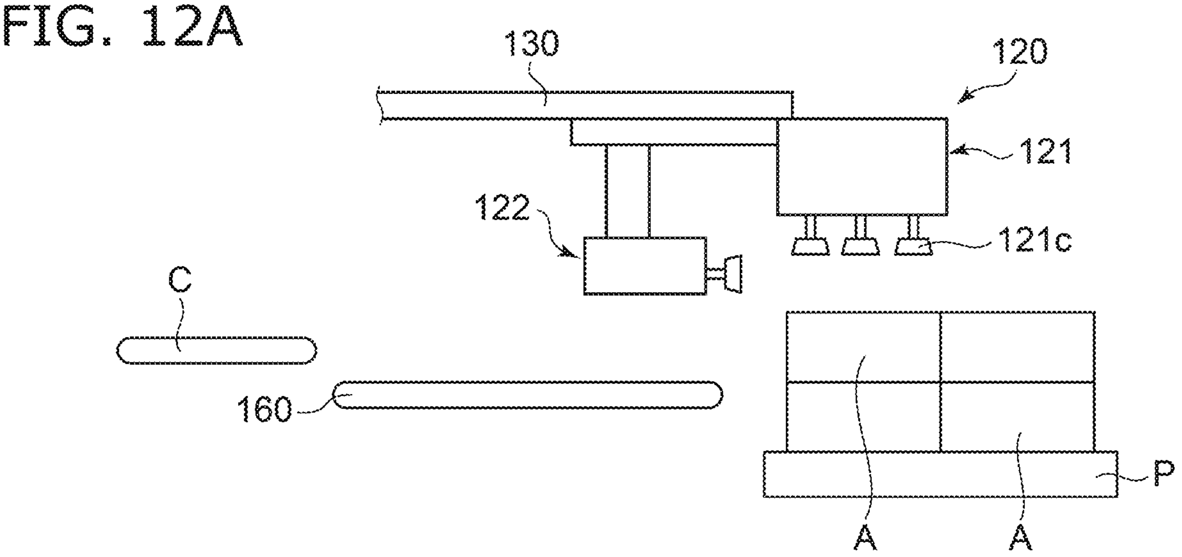
FIGS. 12A to 12C a are schematic views showing another operation of the cargo handling apparatus according to the embodiment.
Figure 12B:
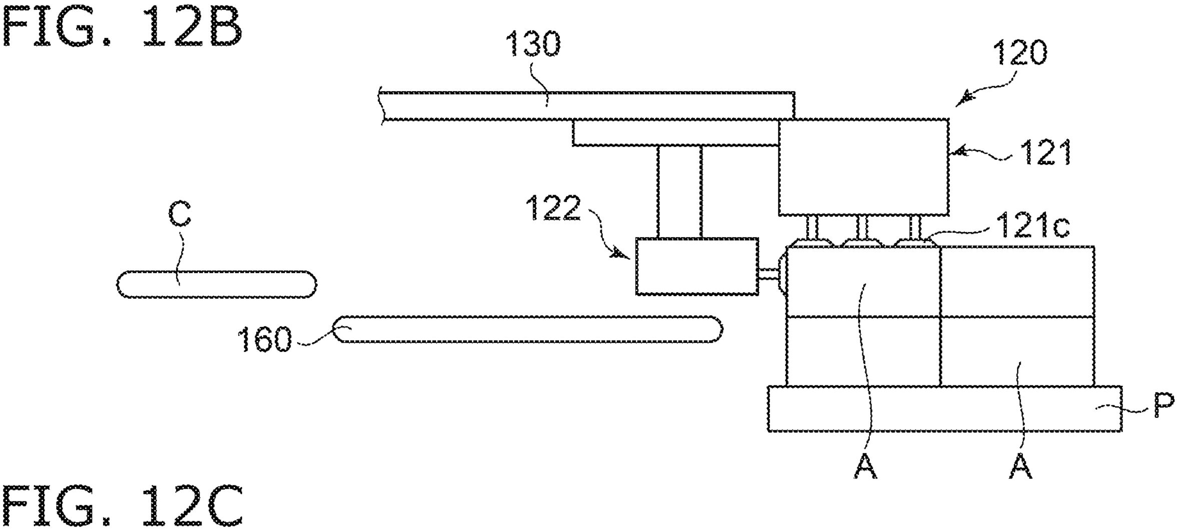
Figure 12C:
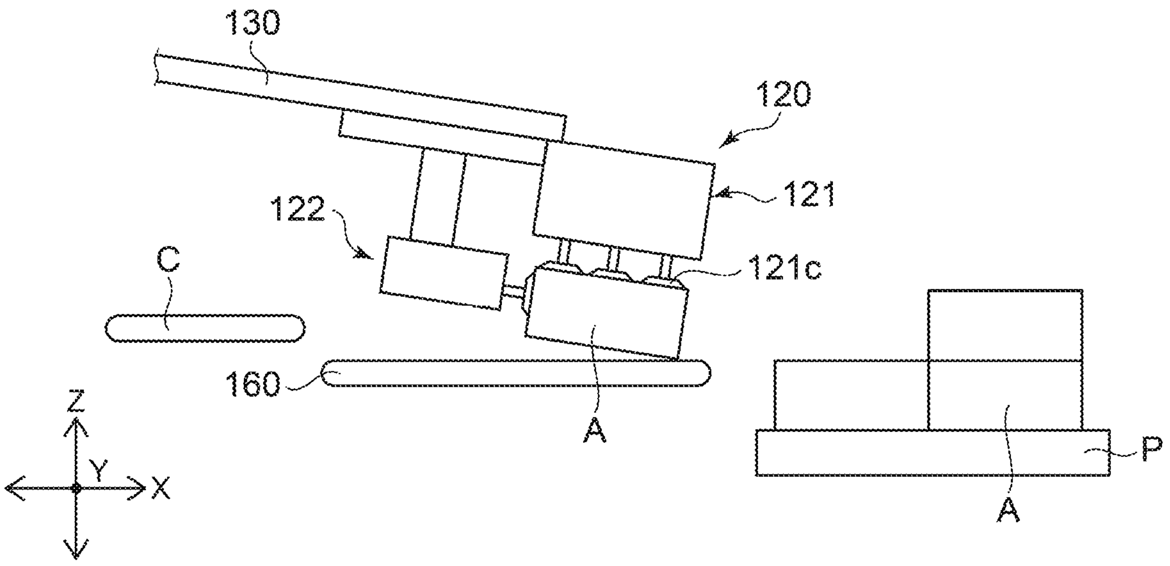

As shown in FIG. 12A, the robot arm 130 moves the hand 120 above the article A determined to be the holding object. Also, the Z-direction position of the transfer device 160 is set to the same position as the bottom surface of the article A to be held. The moving device 170 lowers the hand 120 toward the article A. As shown in FIG. 12B, the upper surface suction-gripping unit 121 and the side surface suction-gripping unit 122 respectively suction-grip the upper surface and side surface of the article A. As shown in FIG. 12C, the robot arm 130 transfers the article A that is held onto the transfer device 160. For example, the robot arm 130 transfers the article A onto the transfer device 160 by sliding. At this time, the hand 120 may be oblique to the X-Y plane as illustrated. The contact area between the bottom surface of the article A and another article (or the pallet P) can be reduced thereby, and the friction can be reduced.

Figure 13A:
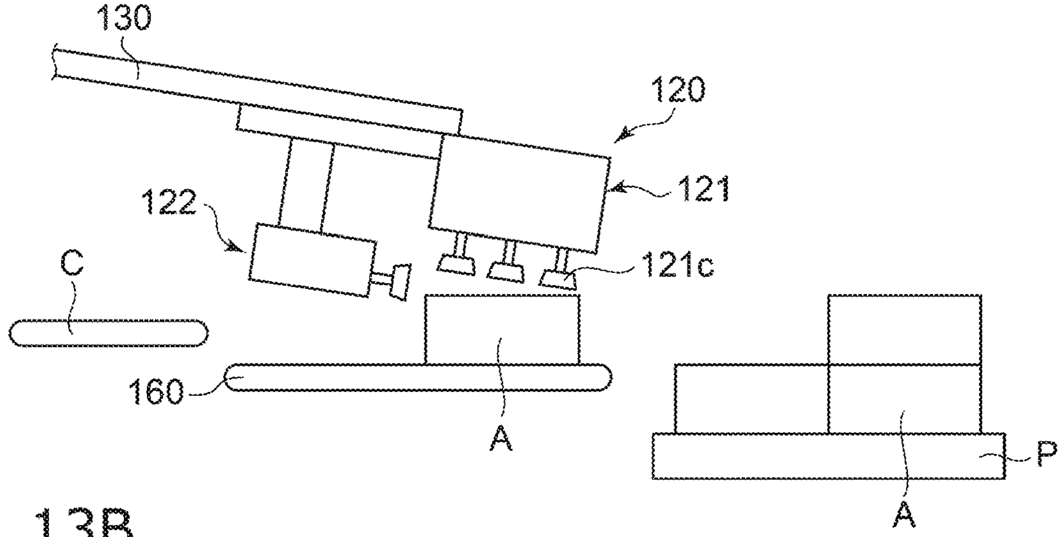
FIGS. 13A to 13C are schematic views showing another operation of the cargo handling apparatus according to the embodiment.
Figure 13B:
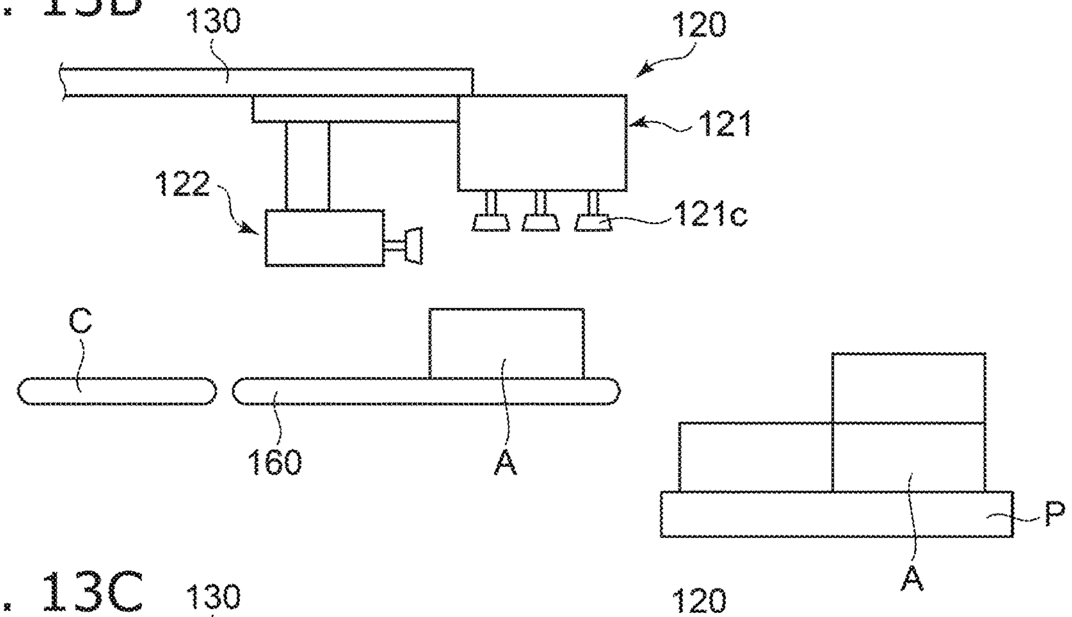
Figure 13C:
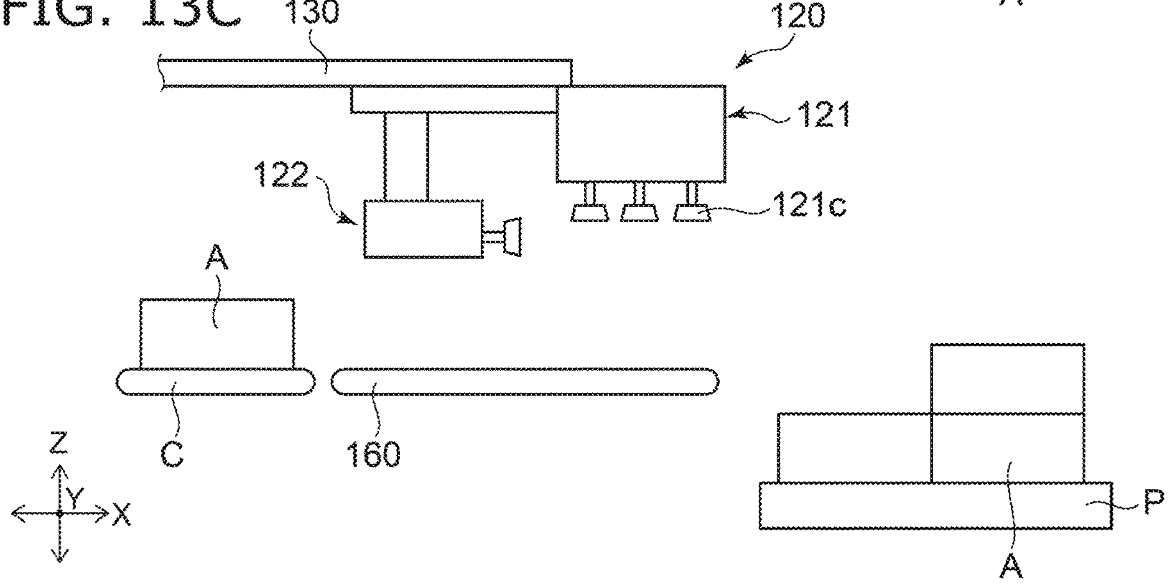

As shown in FIG. 13A, the hand 120 releases the holding by the upper surface suction-gripping unit 121 and the side surface suction-gripping unit 122. As shown in FIG. 13B, the moving device 180 sets the Z-direction position of the transfer device 160 to the same position as the transfer device C. Also, the moving device 170 raises the hand 120 and the robot arm 130. As shown in FIG. 13C, the transfer device 160 transfers the transferred article A to the transfer device C. The operation shown in FIGS. 12A to 13A corresponds to the first operation. The operation shown in FIGS. 13B and 13C corresponds to the second operation.

According to the second holding method, the stability of the holding is better than that of the first holding method because the upper surface and side surface of the article are held. Also, compared to when the article is raised, the time of the first operation can be reduced by sliding the article. Therefore, the efficiency of the cargo handling task can be further increased. According to the first holding method, the article A can be transferred regardless of the state between the transfer device 160 and the article A that is held because the article A is raised.

An instruction that indicates the use of one of the first holding method or the second holding method may be input to the cargo handling apparatus 100. The cargo handling apparatus 100 switches the first holding method and the second holding method according to the received instruction. The instruction may be input by a user or may be transmitted by a higher-level host computer, etc. Whether to use the first holding method or the second holding method may be determined based on the measurement results of the first and second measuring instruments 141 and 142. For example, the second holding method is used when the path between the transfer device 160 and the article determined to be the holding object is flat and the article is slidable. The first holding method is used when the path is not flat. The path is the upper surface of the other article or the upper surface of the pallet P.

Second Modification

According to the first modification, when interference of the robot arm 130 will occur when holding one article, it is determined whether or not another article can be held without interference. In contrast, in a second modification, the previous article is placed on the transfer device 160 so that interference will not occur when the next article is held.

Figure 14:
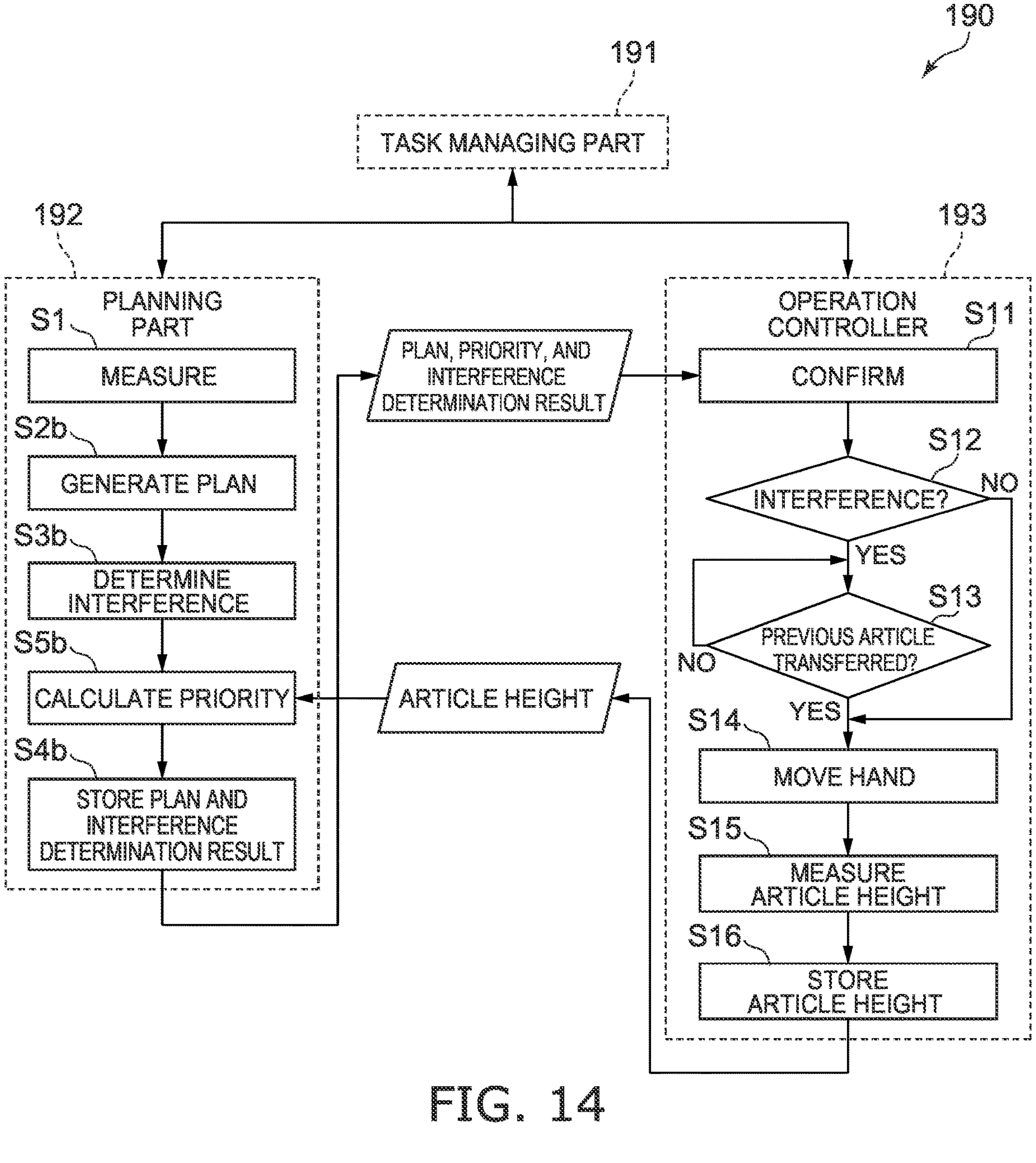
FIG. 14 is a schematic view showing a function of a control device of a cargo handling apparatus according to the second modification of the embodiment.

FIG. 14 is a schematic view showing a function of a control device of a cargo handling apparatus according to the second modification of the embodiment.

According to the second modification shown in FIG. 14, in step S2*b* after step S1, the planning part 192 generates plans for the article to be transferred directly thereafter (first) and the article to be transferred next (second). The planning part 192 generates operation paths related to placement positions for the first article while changing the placement position of the article on the transfer device 160. Thereby, multiple plans are generated for the first article. For example, a plan is generated for the second article to minimize the operation path.

In step S3*b*, the planning part 192 determines whether or not the robot arm 130 will interfere with the transfer device 160 or the article on the transfer device 160 when performing the first operation for the first article for each plan related to the first article. Furthermore, the planning part 192 determines whether or not the robot arm 130 will interfere with the first article on the transfer device 160 when performing the first operation for the second article for each plan related to the first article. The planning part 192 calculates the priorities for the plans related to the first article (step S5*b*). The priority is calculated based on the operation distance and the interference determination result. Specifically, the priority that is set is increased as the operation path decreases. The priority is greatly reduced for plans in which interference will occur. The planning part 192 stores the multiple plans related to the first article and the priorities and interference determination results for the plans.

The operation controller 193 confirms the plan with the highest priority and the interference determination result of the plan in step S11. As described above, the priority is greatly reduced for the plans in which interference will occur. Therefore, as a result, a plan among the multiple plans related to the first article in which interference by the robot arm 130 will not occur is selected. Thereafter, similarly to the cargo handling method shown in FIG. 5, steps S12 to S16 are performed.

FIG. 15A, FIG. 15B, FIG. 16A, and FIG. 16B are schematic views showing an operation of the cargo handling apparatus according to the second modification of the embodiment.

Figure 15A:
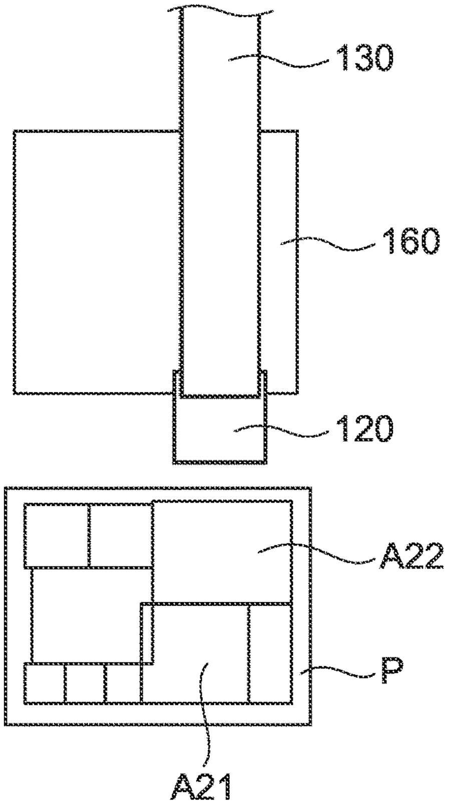
FIGS. 15A and 15B are schematic views showing an operation of the cargo handling apparatus according to the second modification of the embodiment.

In the state shown in FIG. 15A, multiple articles that include articles A21 and A22 are placed on the pallet P. For example, the upper surface of the article A21 is positioned higher than the upper surface of the article A22. The article A21 is determined to be transferred first, and the article A22 is determined to be transferred second.

Figure 15B:
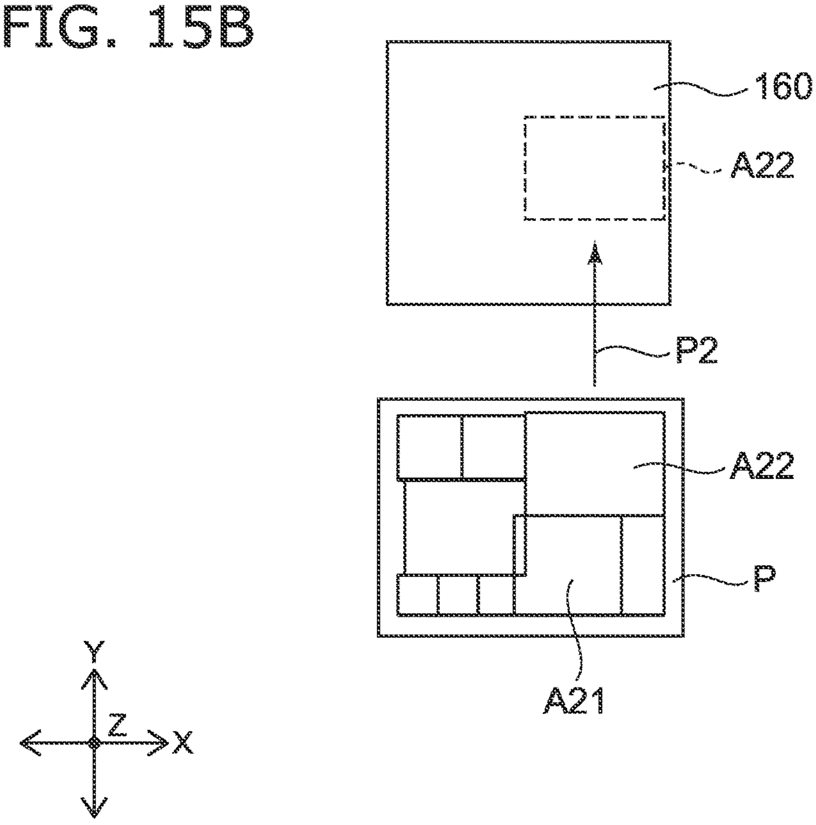
Figure 16A:
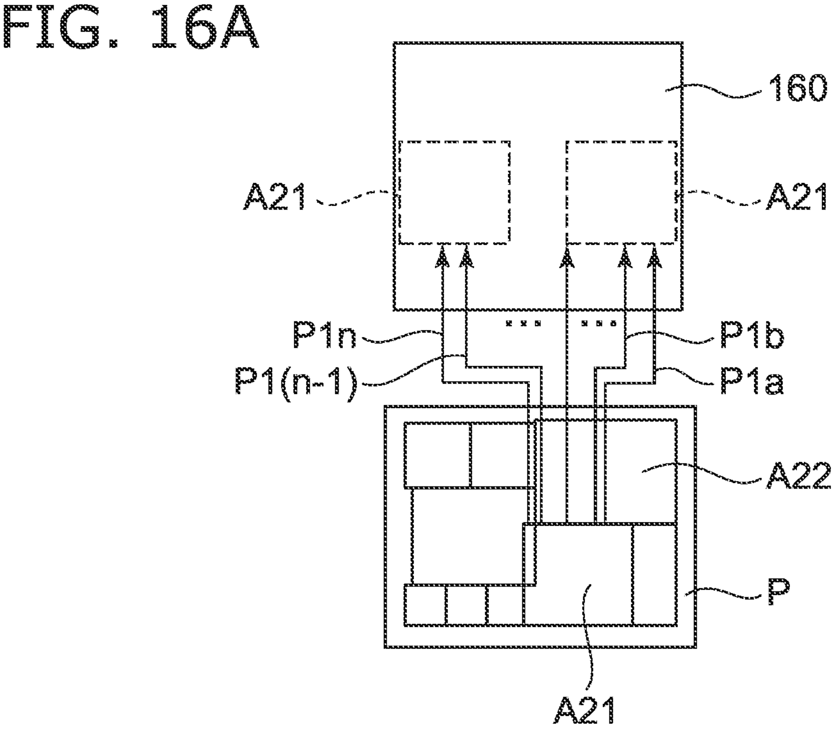
FIGS. 16A and 16B are schematic views showing an operation of the cargo handling apparatus according to the second modification of the embodiment.
Figure 16B:
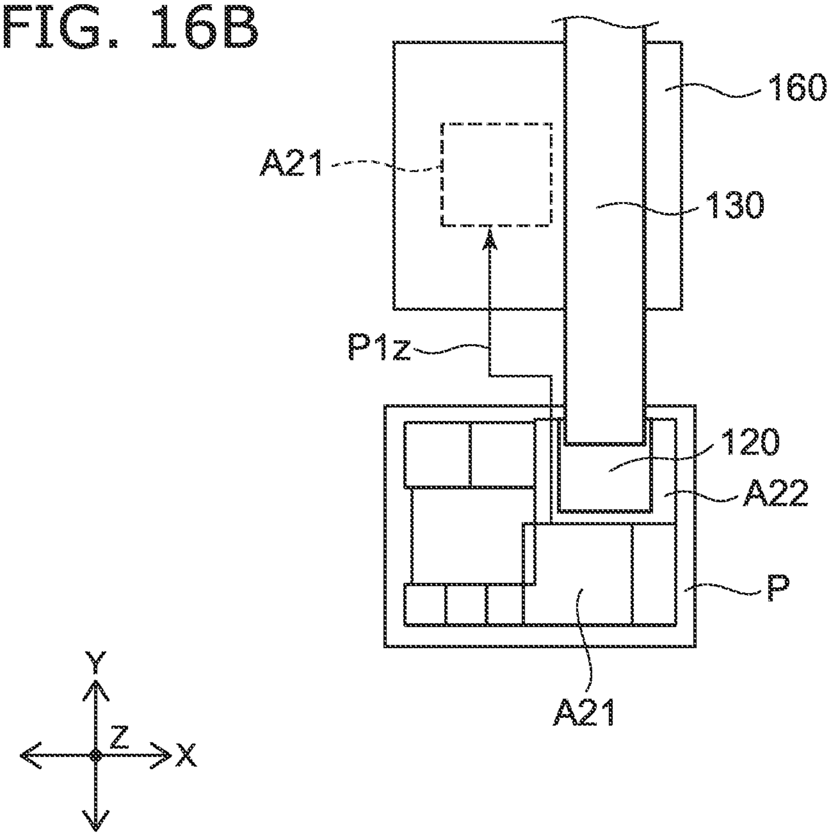

The planning part 192 generates plans for the article A22. For example, as shown in FIG. 15B, a plan P2 that has the shortest operation path to the transfer device 160 is generated. The planning part 192 also generates multiple plans for the article A21. For example, as shown in FIG. 16A, multiple plans P1*a* to P1*n* are generated while changing the placement position on the transfer device 160. The planning part 192 determines whether or not the robot arm 130 will interfere with the article A21 on the transfer device 160 when performing the first operation for the article A22 for each of the multiple plans P1*a* to P1*n*. Based on the distance of the operation path and the determination result of the interference, the planning part 192 sets the priorities of the multiple plans P1*a* to P1*n*. As a result, for example, the priority of a plan P1*z* shown in FIG. 16B is set to be the highest. According to the plan P1*z*, the robot arm 130 does not interfere with the article A21 when performing the first operation for the article A22.

According to the second modification, the first operation for the article A21 is performed so that interference of the robot arm 130 does not occur in the first operation for the article A22. Therefore, the first operation for the article A22 can be performed in parallel with the second operation for the article A21. The frequency that the first operation is performed in parallel with the second operation can be increased, and the efficiency of the cargo handling task can be further improved.

Figure 17:
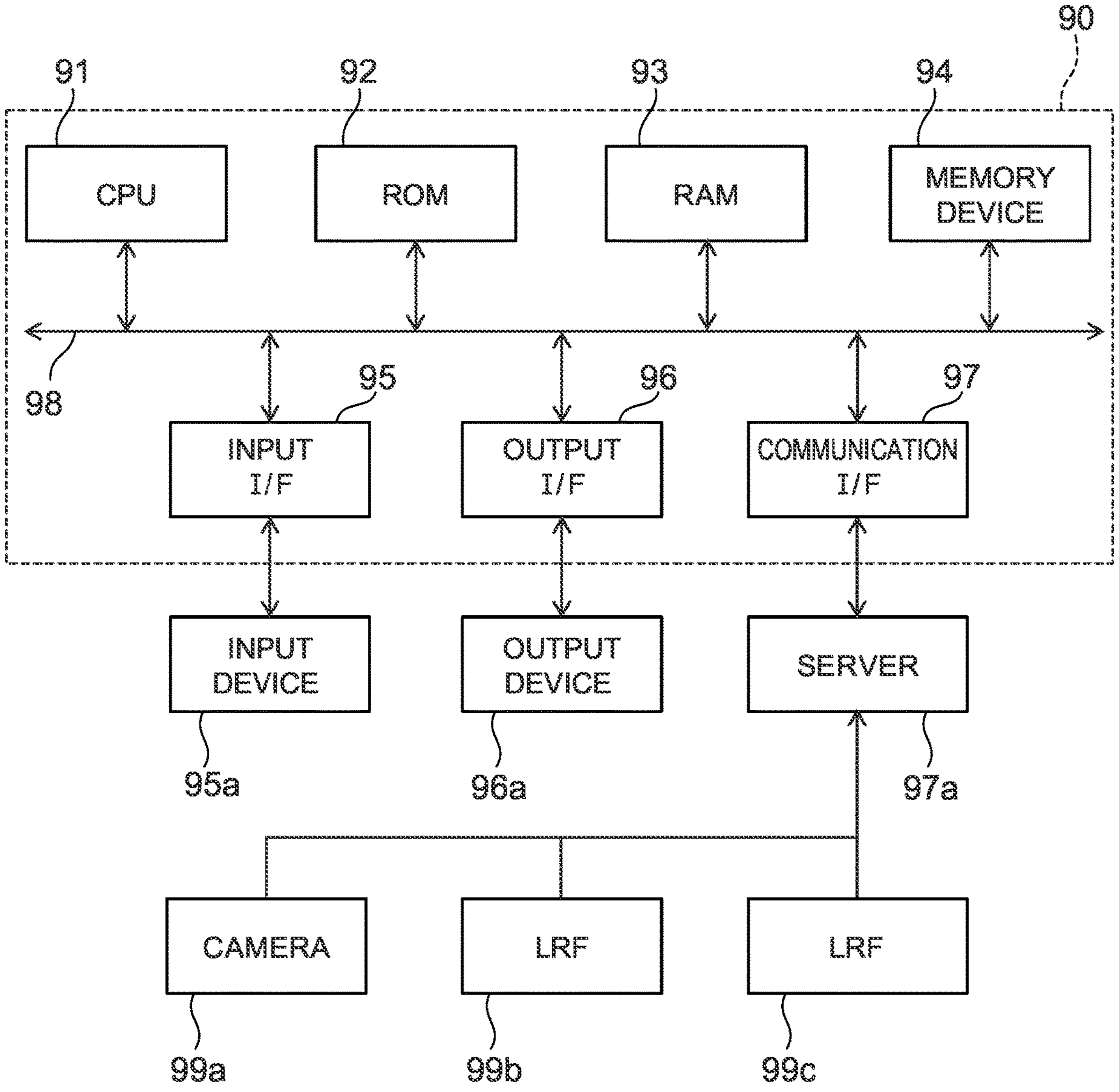
FIG. 17 is a schematic view showing a hardware configuration.

FIG. 17 is a schematic view showing a hardware configuration.

The control device 190 includes, for example, the hardware configuration shown in FIG. 17. A processing device 90 shown in FIG. 17 includes a CPU 91, ROM 92, RAM 93, a memory device 94, an input interface 95, an output interface 96, and a communication interface 97.

The ROM 92 stores programs that control the operations of the computer. Programs that are necessary for causing the computer to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the programs, the CPU 91 executes various processing by controlling configurations via a system bus 98.

The memory device 94 stores data necessary for executing the programs and/or data obtained by executing the programs.

The input interface (I/F) 95 connects the processing device 90 and an input device 95*a*. The input I/F 95 is, for example, a serial bus interface such as USB, etc. The CPU 91 can read various data from the input device 95*a* via the input I/F 95.

The output interface (I/F) 96 connects the processing device 90 and an output device 96*a*. The output I/F 96 is, for example, an image output interface such as Digital Visual Interface (DVI), High-Definition Multimedia Interface (HDMI (registered trademark)), etc. The CPU 91 can transmit data to the output device 96*a* via the output I/F 96 and cause the output device 96*a* to display an image.

The communication interface (I/F) 97 connects the processing device 90 and a server 97*a* outside the processing device 90. The communication I/F 97 is, for example, a network card such as a LAN card, etc. The CPU 91 can read various data from the server 97*a* via the communication I/F 97. A camera 99*a* images articles and stores the images in the server 97*a*. The camera 99*a* functions as the imaging part 141*a*. LRFs 99*b* and 99*c* function as the distance sensors 142*a* and 143*a*.

The memory device 94 includes at least one selected from a hard disk drive (HDD) and a solid state drive (SSD). The input device 95*a* includes at least one selected from a mouse, a keyboard, a microphone (audio input), and a touchpad. The output device 96*a* includes at least one selected from a monitor, a projector, a speaker, and a printer. A device such as a touch panel that functions as both the input device 95*a* and the output device 96*a* may be used.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

According to the embodiments described above, a cargo handling apparatus, a control device, a cargo handling method, a program, and a storage medium are provided in which the efficiency of the cargo handling task can be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A handling apparatus, comprising:

a hand configured to hold an object;

a robot arm configured to move the hand;

a transfer device arranged with the robot arm in a first direction, the transfer device configured to transfer the object transferred by the hand, the transfer device being configured to move vertically, the robot arm being located above the transfer device;

a measurement device configured to measure a position and a size of the object; and a control device configured to perform a first operation of transferring the object to the transfer device by using the hand and the robot arm, the first operation including lifting the object, moving the object horizontally, and lowering the object, and a second operation of transferring the transferred object by using the transfer device, the control device being configured to determine, based on a measurement result of the measurement device, whether or not the robot arm will interfere with the transfer device or a second object on the transfer device when performing the first operation for a first object, and generate a result of the determination, the control device being configured to control a start timing of the first operation for the first object according to the generated determination result of the interference.

2. The apparatus according to claim 1, wherein when the interference will not occur, the control device accelerates the start timing of the first operation for the first object compared to when the interference will occur.

3. The apparatus according to claim 1, wherein when the interference will not occur, the control device transfers the first object while performing the second operation for the second object.

4. The apparatus according to claim 1, wherein when the interference will occur, the control device starts the first operation for the first object after completing the second operation for the second object.

5. The apparatus according to claim 1, further comprising:

a moving device configured to move the transfer device along the first direction, the control device being configured to use the moving device to move the transfer device away from the robot arm when starting the first operation for the first object when the interference will occur.

6. The apparatus according to claim 5, wherein when the interference will not occur, the control device does not cause the transfer device to move when starting the first operation for the first object.

7. The apparatus according to claim 1, wherein when the interference will occur, the control device starts the first operation for a third object while performing the second operation for the second object, and the third object is different from the first object.

8. The apparatus according to claim 7, wherein the transfer device is configured to transfer the object in a second direction crossing the first direction, a position of the third object in a third direction is different from a position of the first object in the third direction, and the third direction crosses a plane along the first and second directions.

9. The apparatus according to claim 1, wherein in the first operation for the second object, the control device calculates a position on the transfer device at which the robot arm does not interfere with the second object when performing the first operation for the first object, and causes the robot arm and the hand to transfer the second object to the calculated position.

10. The apparatus according to claim 1 wherein the measurement device includes:

a first measuring instrument configured to measure the position and size of the object when viewed along the first direction; and a second measuring instrument configured to measure a length in the first direction of the object.

11. The apparatus according to claim 10, further comprising:

a moving device configured to move the second measuring instrument along the first direction, the second measuring instrument including a distance sensor, the distance sensor configured to measure a distance to the object in a direction crossing the first direction, the moving device configured to move the distance sensor in a direction opposite to a movement direction of the object while the robot arm moves the object.

12. The apparatus according to claim 1, wherein the hand includes:

a first suction-gripping unit configured to suction-grip the object in the first direction, and a second suction-gripping unit configured to suction-grip the object in a second direction crossing the first direction.

13. The apparatus according to claim 12, wherein based on the measurement result measured by the measurement device, the control device switches between:

a first holding method of holding the object by using only the first suction-gripping unit; and a second holding method of holding the object by using the first and second suction-gripping units.

14. A handling apparatus, comprising:

a hand configured to hold an object;

a robot arm configured to move the hand;

a transfer device located below the robot arm, the transfer device being configured to transfer the object transferred by the hand, the transfer device being configured to move vertically;

a measurement device configured to measure a position and a size of the object; and a control device configured to cause the handling apparatus to perform a first operation transferring the object to the transfer device by using the hand and the robot arm, the first operation including lifting the object, moving the object horizontally, and lowering the object, and a second operation transferring the transferred object by using the transfer device, the control device being configured to determine, based on a measurement result of the measurement device, whether or not the robot arm will interfere with the transfer device or a second object on the transfer device when performing the first operation for a first object, and generate a determination result of whether interference will occur, when the hand is to hold the first object, compared to when interference of the robot arm with the transfer device or the second object on the transfer device will occur, a start timing of the holding of the first object by the hand being accelerated when the generated determination result indicates that interference will not occur.

15. A control device, the control device being configured to cause a cargo handling apparatus to perform a first operation and a second operation, the handling apparatus including:

a hand configured to hold an object;

a robot arm configured to move the hand;

a transfer device arranged with the robot arm in a first direction, the transfer device configured to transfer the object transferred by the hand, the transfer device being configured to move vertically, the robot arm being located above the transfer device; and a measurement device configured to measure a position and a size of the object, the first operation including lifting the object, moving the object horizontally, and lowering the object, the first operation transferring the object to the transfer device by using the hand and the robot arm, the second operation transferring the transferred object by using the transfer device, the control device being configured to determine, based on a measurement result of the measurement device, whether or not the robot arm will interfere with the transfer device or a second object on the transfer device when performing the first operation for a first object, and generate a determination result of whether interference will occur, the control device being configured to control a start timing of the first operation for the first object according to the generated determination result of the interference.

16. A handling method, the handling method causing a handling apparatus to perform a first operation and a second operation, the handling apparatus including:

a hand configured to hold an object;

a robot arm configured to move the hand;

a transfer device arranged with the robot arm in a first direction, the transfer device being configured to transfer the object transferred by the hand, the transfer device being configured to move vertically, the robot arm being located above the transfer device; and a measurement device configured to measure a position and a size of the object, the first operation transferring the object to the transfer device by using the hand and the robot arm, the first operation including lifting the object, moving the object horizontally, and lowering the object, the second operation transferring the transferred object by using the transfer device, the handling method comprising:

determining, based on a measurement result of the measurement device, whether or not the robot arm will interfere with the transfer device or a second object on the transfer device when performing the first operation for a first object, and generate a determination result of whether interference will occur; and controlling a start timing of the first operation for the first object according to the generated determination result of the interference.

17. A non-transitory computer-readable storage medium storing a program, the program causing a control device of a handling apparatus to perform a first operation and a second operation, the handling apparatus including:

a hand configured to hold a first object;

a robot arm configured to move the hand;

a transfer device arranged with the robot arm in a first direction, the transfer device configured to transfer the object transferred by the hand, the transfer device being configured to move vertically, the robot arm being located above the transfer device; and a measurement device configured to measure a position and a size of the first object, the first operation transferring the first object to the transfer device by using the hand and the robot arm, the first operation including lifting the object, moving the object horizontally, and lowering the first object, the second operation transferring the transferred first object by using the transfer device, the program being configured to cause the control device to:

determine, based on a measurement result of the measurement device, whether or not the robot arm will interfere with the transfer device or a second object on the transfer device when performing the first operation for the first object and generate a determination result of whether interference will occur, and control a start timing of the first operation for the first object according to the generated determination result of the interference.

18. The apparatus according to claim 1, wherein the control device is further configured to perform, prior to performing the first operation, a planning operation including generating the determination result.

19. The apparatus according to claim 1, wherein the control device is further configured to store the determination result as part of a planning operation, and control the start timing of the first operation for the first object according to the stored determination result.

* * * * *